United States Patent [19]
Ricciardi

[11] Patent Number: 5,140,581
[45] Date of Patent: Aug. 18, 1992

[54] READ WINDOW FOR ENVELOPE READER

[75] Inventor: Mario Ricciardi, Glenview, Ill.

[73] Assignee: Bell & Howell Phillipsburg Co., Allentown, Pa.

[21] Appl. No.: 547,250

[22] Filed: Jul. 3, 1990

Related U.S. Application Data

[63] Continuation of Ser. No. 298,542, Jan. 18, 1989, Pat. No. 4,955,596.

[51] Int. Cl.$^5$ .................. G06K 19/06; G06K 13/00; G06K 13/06; B07C 5/00
[52] U.S. Cl. .................. 235/493; 235/454; 235/475; 235/477; 235/482; 235/483; 235/484; 209/584; 209/900
[58] Field of Search ........ 235/493, 454, 475, 482, 235/483, 484, 485, 477; 209/584, 900; 40/341, 348, 349, 352; 271/110, 117; 369/117, 120; 250/229

[56] References Cited

U.S. PATENT DOCUMENTS

| | | | |
|---|---|---|---|
| 3,671,721 | 6/1972 | Hunn et al. | 235/61.11 H |
| 3,947,934 | 4/1976 | Olson | 29/25.42 |
| 4,396,902 | 8/1983 | Warthan et al. | 235/485 |
| 4,457,016 | 6/1984 | Pfeffer | 235/483 |
| 4,738,368 | 4/1988 | Shaw | 209/584 |
| 4,838,435 | 6/1989 | Alexandre et al. | 209/584 |
| 4,886,596 | 12/1989 | Sasage et al. | 209/584 |
| 4,954,698 | 9/1990 | Yasunaga et al. | 235/484 |
| 4,955,596 | 9/1990 | Ricciardi | 291/110 |

FOREIGN PATENT DOCUMENTS 0209816 5/1987 European Pat. Off. .
8602186 4/1986 World Int. Prop. O. .
8604172 7/1986 World Int. Prop. O. .

Primary Examiner—Stuart S. Levy
Assistant Examiner—Tan Nguyen
Attorney, Agent, or Firm—Griffin, Branigan & Butler

[57] ABSTRACT

An apparatus (570) for forming a window in which printed characters on an item such as an envelope can be read. The apparatus (570) comprises a base member (572) fastened to a planar horizontal surface (508) and positionable intermediate a reader device (50) and an on-edge envelope. The base member (572) has an elongated vertical slot provided (576) therein. A slide member (584) has a bottom edge which includes a dimpled portion. The dimpled portion of the slide member (584) fits into the elongated vertical slot (576) of the base member (572). The base member (572) carries a block (578) which accommodates a screw (582) for selectively adjusting the position of the bottom edge of the slide member (584) relative to the base member (572). A bottom edge of the slide member (584) and a portion of the elongated vertical slot (576) below the bottom edge of the slide member (584) form a read window through which characters are readable. The slide member (584) has indicia provided thereon and is resilient so that a top portion thereof acquires an angular orientation imposed by a top of the base member (572).

20 Claims, 11 Drawing Sheets

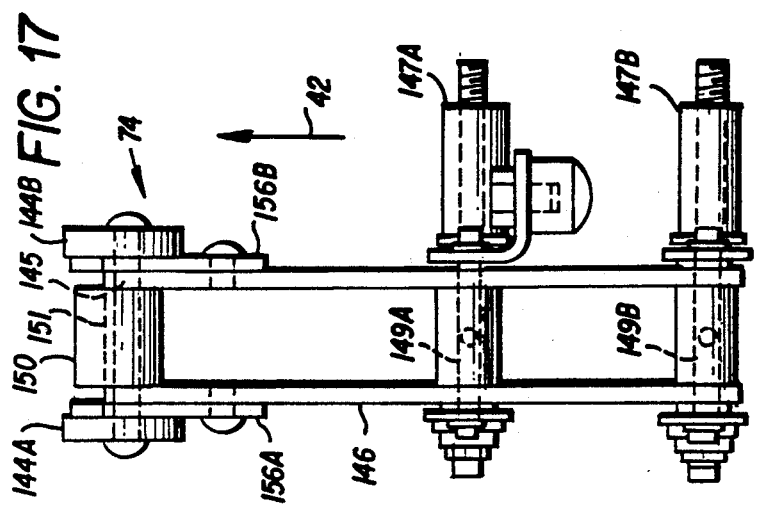
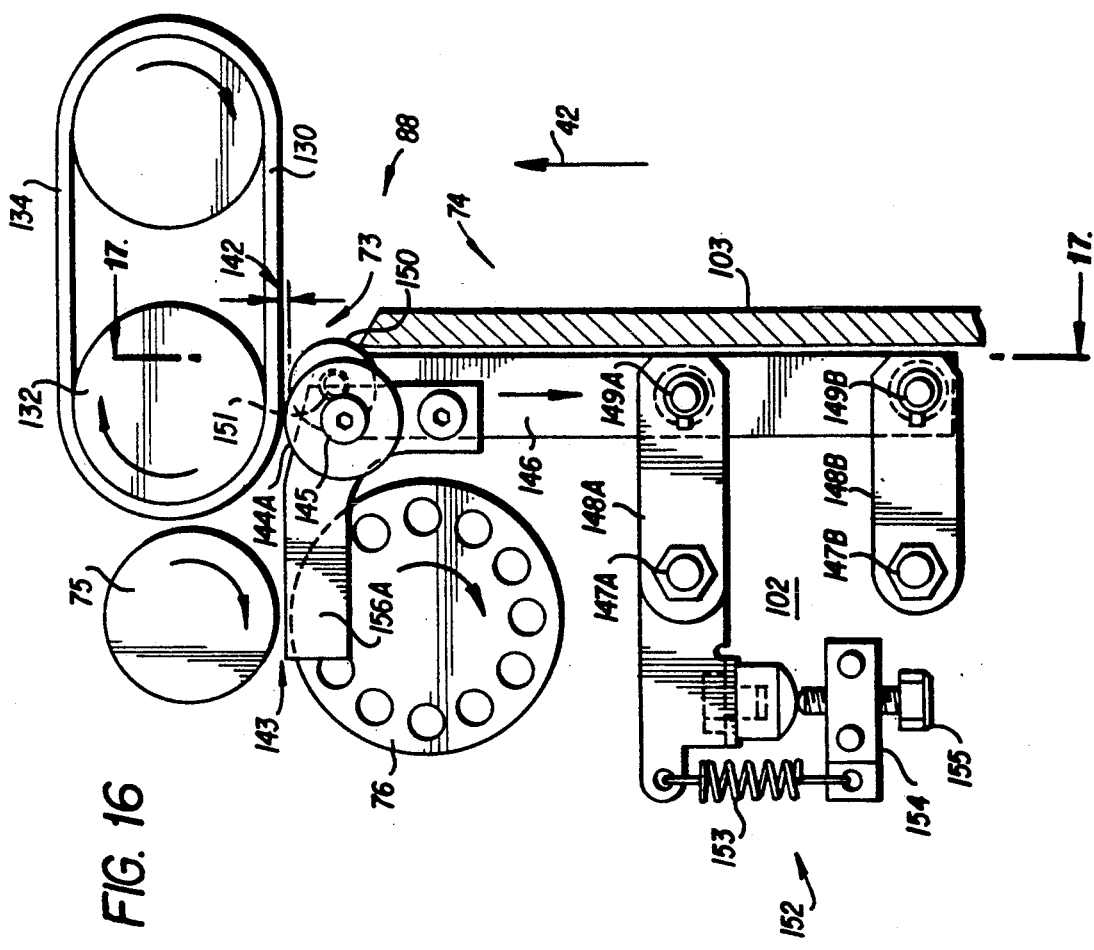

READ WINDOW FOR ENVELOPE READER

This application is a continuation application of U.S. patent application Ser. No. 07/298,542, filed Jan. 18, 1989, now U.S. Pat. No. 4,955,596.

BACKGROUND

1. Field of the Invention

This invention pertains to the feeding and stacking of items such as stuffed envelopes, and particularly to methods and apparatus for feeding and stacking such items on-edge.

2. Prior Art and Other Considerations

The prior art includes teachings of envelope processing systems wherein envelopes in a stack are conveyed on-edge in a feed direction toward a feeder for redirecting the envelope toward a singulation gap. The feeder, such as an revolving endless belt, for example, contacts a sidewall of a lead envelope for directing the lead envelope, in a direction orthogonal to the feed direction, toward the singulation gap.

Prior art envelope processing systems of the type just described have considerable difficulty in handling envelopes of varying thicknesses. Accordingly, significant problems are encountered when the same envelope processing system is expected to run a batch of envelopes which includes both thick and thin stuffed envelopes. If the singulation gap is sized for large envelopes, then a plurality of envelopes ("doubles") might be fed essentially simultaneously through the singulation gap. On the other hand, if the singulation gap is sized for small envelopes, the envelope processing system may fail to direct a thicker envelope toward and through the singulation gap.

Envelope processing systems which handle on-edge envelopes also are very awkward in stacking envelopes after the envelopes have undergone a processing (such as character reading or label printing). The potential interference with envelopes already-stored in a discharge stack poses problems for the introduction of an another on-edge envelope into the stack. Such unwelcomed interference is typically occasioned by a potentially obstructive path of envelope travel; by a high degree of friction between envelopes and the stack-defining structure wherein they travel; and, by difficulty in obtaining and maintaining proper registration of the envelopes introduced into the discharge stack.

In view of the foregoing, an object of the present invention is the provision of method and apparatus for facilitating the handling of envelopes of varying thicknesses by an on-edge envelope processing system.

An advantage of the present invention is the provision of method and apparatus for facilitating the feeding of envelopes of varying thicknesses in an on-edge envelope processing system.

Another advantage of the present invention is the provision of method and apparatus for facilitating the introduction of processed envelopes into a discharge stack wherein the envelopes are oriented on-edge.

A further advantage of the present invention is the provision of method and apparatus for facilitating the smooth and silent stacking of on-edge envelopes in a discharge stack wherein envelopes are oriented on-edge.

SUMMARY

An envelope processing system includes an input transport section; a processing/transport section; and a discharge transport section Envelopes are fed on-edge from the input transport section to the processing/transport section by a feeder section. The envelopes travel on-edge and one-at-a-time through the processing/transport section which includes an optical character reader and a bar code printer. From the processing/transport section the envelopes are loaded on-edge onto the discharge transport section by a stacker section.

In the feeder section, a foremost envelope in an input magazine contacts a feeder and a feed assist device (also known as a "helping hand"). The feeder directs the foremost on-edge envelope toward a singulation region (defined by a first pair of rollers, including a driven "pull-out" roller). The singulation region includes a first stage singulation gap (defined between a feed belt and an adjustably-biased singulation member) and a second stage-singulation gap.

A signal controller monitors when the feeder is having difficulty in feeding an envelope by timing the delay elapsed since the feeding of a previous envelope. In this respect, if a predetermined number of envelopes are not detected as having passed through the singulation region in a given unit of time, the signal controller presumes that the feeder is experiencing difficulty in feeding the next article, likely because of a greater thickness of the next article. In such a case, the signal controller enables the feeder to acquire greater contact with the next envelope by displacing the feed assist device out of its normally biased co-planar position with the feed belt of the feeder. This is done by sending a signal to an assist displacement control means, which signal causes the displacement of a feeler-switch-borne translatable block. Movement of the feeler switch away from the feed assist means, and particularly out of contact with a cam surface of a feed assist carriage, results in the activation of an input transport motor. Activation of the input transport motor resumes incremental advancement of on-edge stacked envelopes toward the feeder and the feed assist means, with a resulting greater pressure bearing against the displaceable feed assist means. When the bias of the feed assist means is overcome by such pressure, the feed assist means is displaced further away from a plane of tangency T with the feeder belt, so that the feeder belt has greater contact with the thick envelope. The greater contact of the feeder assist means with the thick envelope and the greater pressure urging the contact of the two results in the application of a greater force vector on the thick envelope in the direction of the compliant roller pair forming the singulation gap.

The feeder section comprises a selectively. revolvable feeder belt entrained about two pulleys, one of the pulleys being a driven/braked pulley and the other pulley being an idler pulley. A portion of the course of travel of the belt lies in a tangent plane T which is essentially parallel to the sidewalls of on-coming envelopes and which contacts the sidewall of the foremost envelope in the input magazine. Revolution of the driven pulley causes revolution of the feeder belt, with the frictional contact of the belt with the foremost envelope serving to direct the foremost envelope toward the singulation gap. In one embodiment of the invention, the axes of the two rollers comprising the feeder are fixed vertical axes. In a second embodiment, the axis of the driven roller is a fixed vertical axis, while the vertical axis of the idle roller is pivotal about the fixed vertical axis of the driven roller. In the second embodiment, revolution of the feeder belt causes the idle roller to pivot, which in turn causes the feeder belt to pivot or kick in towards the foremost envelope, and thereby apply a greater vector force to direct the foremost envelope toward the singulation gap.

The stacker section is downstream from the processing/transport section to receive envelopes tranported on-edge thereto. The stacker section includes introductory conveying means, stacker conveying means, and a discharge magazine The introductory conveying means comprises O-ring pairs which direct an on-edge envelope along an introductory path. This introductory path is oriented at an acute angle with respect to a processing path of the processing/transport section. The introductory conveying means directs an article toward the stacker conveying means, so that a leading edge of the envelope strikes a pair of vertically-spaced belts forming the stacker conveying means. The stacker belts follow a triangular course of travel, and define a first linear path segment and a second linear path segment. In directing an envelope along the first linear path segment, the stacker conveying means causes the envelope to be deflected through an obtuse angle with respect to the introductory path.

In the following the first linear path segment defined by the stacker conveying means, the leading edge of an envelope is directed to a vertex of the stacker belt triangular path for interposition between a previously stacked envelope and the stacker belts. That is, as the leading edge of the envelope reaches a pulley forming a vertex of the triangular path, the leading edge is interposed between the midsection of the previously stacked envelope and the stacker belts at a bend point whereat the stacker belts turn at an obtuse angle to define a second linear path segment. This second linear path segment is thus the second leg of the triangular path.

As a leading envelope edge rounds the bend point and travels up the second linear path segment between the stacker belts and the previously stacked envelope, the trailing edge of the envelope "fishtails" (i.e., is deflected) through an angle which is acute with respect to the first linear path segment. The fishtailing is prompted by the geometrical configuration of the path traveled by the envelope at the bend point, and is further facilitated by the operation of a rotatable positioning element.

In the above regard, an elongated rotatable positioning element is provided in the plane of the discharge magazine. The positioning element is basically threaded along a first portion thereof with the helical threads extending just slightly above the plane of the discharge magazine. The rotating threads of the positioning element catch the bottom of trailing edges of envelopes and displace the trailing edges at least partially through the fishtail angle.

As envelopes travel along the second linear path segment the leading edges thereof strike an abutment wall forming the discharge magazine. The abutment wall has an interior cavity which is filled with acoustic insulating material, so that contact of the leading edge does not result in an audibly loud pop.

As the number of envelopes increases in the discharge magazine, the stack of envelopes in the discharge magazine exerts pressure, through the most recently stacked envelope, against a pressure sensor. The pressure sensor has a pivotal sensor arm which extends through a gap in the two vertically spaced belts forming the stacker conveying means When the envelope pressure in the stack overcomes a biasing force on the sensor arm, the sensor contacts a microswitch, which in turn activates a discharge transport motor to carry on-edge envelopes away from the stacker section.

As the envelopes travel away from the stacker section, vertically-oriented ridges on the abutment wall serve as bearing points to reduce frictional drag between the abutment wall and leading edges of the envelopes. Moreover, envelopes are registered against the abutment wall by the operation of a second portion of the rotatable positioning element. In this regard, the second portion of the rotatable positioning element has arcuate surfaces thereon which periodically extend above the plane of the magazine floor, and thereby slightly elevate the trailing edge of the envelope, so that the envelopes experience a force vector toward the abutment wall.

BRIEF DESCRIPTION OF THE DRAWINGS

The foregoing and other objects, features, and advantages of the invention will be apparent from the following more particular description of preferred embodiments as illustrated in the accompanying drawings in which reference characters refer to the same parts throughout the various views. The drawings are not necessarily to scale, emphasis instead being placed upon illustrating the principles of the invention.

FIG. 16 is a top view of means for defining a first singulation stage of the feeder of the embodiment of FIG. 1; and, FIG. 17 is a partial side view of the means for defining a first singulation stage of the embodiment of FIG. 16 taken along line 17—17.

DETAILED DESCRIPTION OF THE DRAWINGS

Figure 1:
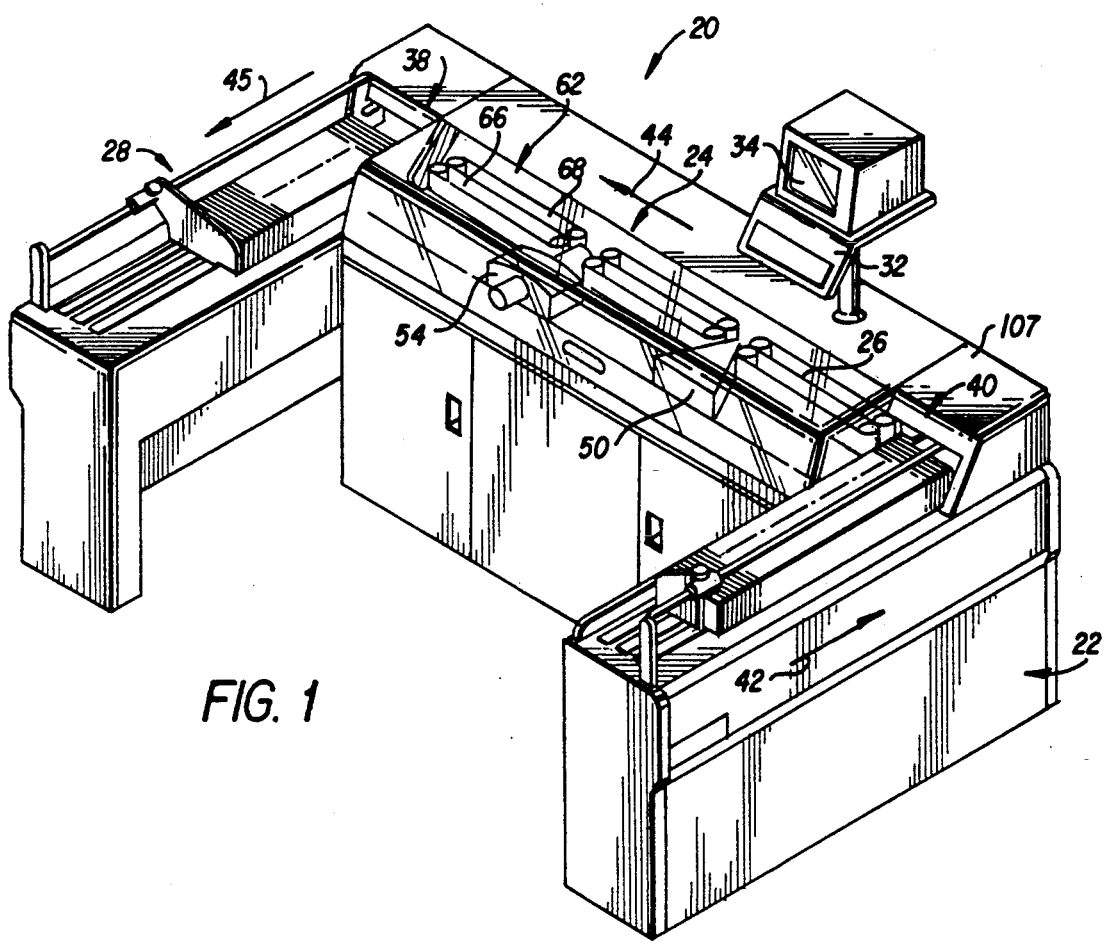
FIG. 1 is a front isometric view showing a feeder and stacker apparatus according to an embodiment of the invention.

FIG. 1 shows a system 20 for processing flat articles, such as envelopes. System 20 comprises an input transport section 22; a processing/transport section 24 wherein flat articles, such as envelopes, are transported along a processing path 26; and, a discharge transport section 28. The processing system 20, hereinafter also referred to as an envelope processing system 20, also includes a keyboard 32; a monitor 34; and, a printer 36.

Envelopes are fed on-edge from the input transport section 22 to the processing/transport section 24 by feeder section 40. The envelopes travel on-edge and one-at-a-time through the processing/transport section 24. From the processing/transport section 24 the envelopes are loaded onto the discharge transport section 28 by stacker section 38.

The direction of envelope travel on the input transport section 22 is shown by arrow 42; the direction of envelope travel from section 22 onto the processing/transport section 24 as propelled by the feeder section 40 is shown by arrow 44; and, the direction of envelope travel on the discharge transport section 28 is shown by arrow 45. The direction of envelope travel on the processing/transport section 24 is perpendicular to the direction of envelope travel on the input transport section 22 and the discharge transport section 28.

In the particular embodiment under discussion, the processing/transport section 24 directs envelopes along the processing path 26 which has reader means 50; a detector photocell 52; and bar code printer means 54 positioned therealong. It should be understood that in other embodiments of the invention, other and/or additional functions can be performed along the processing path 26.

In the embodiment illustrated in FIG. 1, the reader means 50 includes an optical character recognition (OCR) read head 56 and associated electronics for reading alphanumeric information on the sidewall of an on-edge envelope and for generating signals indicative thereof. The bar code printer means 54 includes an ink jet (IJ) printer nozzle 60 and associated ink jet electronics for applying a bar code to the sidewall of an on-edge envelope transported by the nozzle 60. In the illustrated embodiment, the bar code printer means 54 is a Videojet III Bar Code Printer provided by Videojet Systems International.

Envelopes are transported on-edge through the processing/transport section 24 in the direction of arrow 44 by a transport system 62 which includes a series of revolving horizontal belts 64 and a series of revolving vertical belts, including front vertical belts 66 and back vertical belts 68. The bottom edges of envelopes ride on the horizontal belts 64, while the front sidewalls and back sidewalls of the envelopes are contacted by the belts 66 and 68, respectively.

STRUCTURE: FEEDER SECTION

Figure 2:
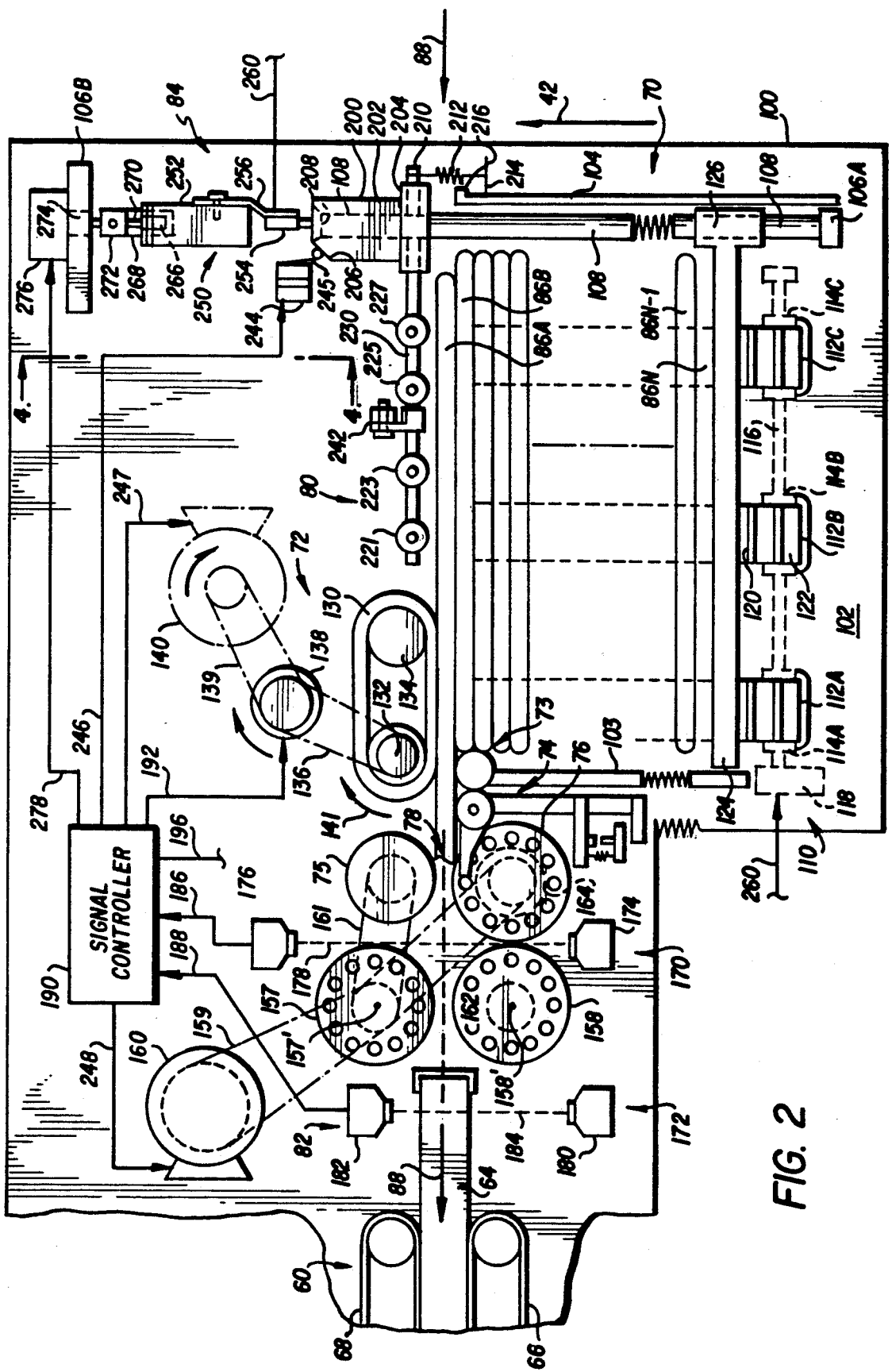
FIG. 2 is a top view of a feeder section of the feeder and stacker apparatus of the embodiment of FIG. 1.

As shown in FIG. 2, the feeder section 22 of the envelope processing system comprises an input magazine 70; feeding means, such as feeder 72; means for defining a singulation region 73, including first stage singulation means 74 and second stage singulation means (including rollers 75 and 76); feed assist means 80 (also known as a "helping hand"); feed interval detection means 82; and, assist displacement control means 84. As will hereinafter be described, envelopes in the input magazine 70 (shown as envelopes 86A through 86N in FIG. 2) are sequentially advanced on-edge to feeder 72. The feeder 72 directs a leading flat envelope in the input magazine 70 (envelope 86A) in a feed direction (indicated by arrow 88) toward the singulation region 73 from whence the envelope 86A is further conveyed along the processing path 26.

The input magazine 70 comprises a magazine frame 100 having a horizontal top surface 102. Standing vertically on the magazine surface 102 is an envelope guide wall 103 which extends along the input transport direction (shown by arrow 42) near the left edge of frame 100. A similar wall 104 is provided near the right edge of frame 100. Two posts 106A and 106B also stand erect on the magazine surface 102 near the envelope guide wall 104. Although equipment housing 107 hides post 106B in FIG. 1, FIG. 2 shows housing 107 removed and post 106B exposed. A guide rod 108 has a first end thereof connected to the post 106A and a second end thereof connected to the post 106B, so that guide rod 108 is held aloft and extends parallel to the input transport direction 42.

The input magazine 70 also includes input transport means 110 for transporting envelopes on-edge to the feeder 72. The input transport means 110 comprises three endless transport belts 112A, 112B, and 112C having upper courses of travel which extend over the magazine top surface 102. Each of the transport belts 112 is entrained about a corresponding driven pulley 114 (situated under magazine top surface 102 near an entrance end of the input magazine 70) and a corresponding (unillustrated) idler pulley, so that the transport belts 112 travel in the input transport direction 42. The driven pulleys 114A, 114B, and 114C are commonly mounted on rotatable shaft 116. Rotatable shaft 116 is driven by input transport motor 118, which provides power to rotate the pulleys 114A, 114B, 114C for propelling the transport belts 112A, 112B, 112C, and the envelopes carried thereon, toward the feeder 72.

In the illustrated embodiment, each of the transport belts 112A, 112B, 112C is an elastomeric timing belt having teeth 120 provided thereon at regularly spaced intervals. Between adjacent ones of the teeth 120 is a trough 122. So configured, the belts 112A, 112B, 112C with teeth 120 and troughs 122 are well suited to engage bottom edges of the envelopes carried on-edge thereon.

The input magazine 70 also includes a compression plate 124. Compression plate 124 has a hollow sleeve member 126 which fits over the guide rod 108, so that compression plate 124 is rotatable about guide rod 108 (away from the magazine top surface 102) and is translatable along guide rod 108 (along the input transport direction 42). Compression plate 124 is essentially a rectangular flat plate which, when left in its ordinary orientation, extends across the top surface 102 of the input magazine 70 in a direction perpendicular to the direction 42 of transport, resting on the tops of the transport belts 112A, 112B, 112C. As will be seen hereinafter, when the transport belts 112A, 112B, 112C are incrementally driven in the input transport direction 42, the compression plate 124, resting on transport belts 112A, 112B, 112C, is also advanced toward the feeder 72, with the result that envelopes between the plate 124 and the feeder 72 are compressed further toward the feeder 72.

The feeder 72 of the embodiment of FIG. 2 comprises an endless belt entrained about feeder rollers 132 and 134. Both feeder rollers 132 and 134 are mounted to rotate about respective stationary vertical axes. Feeder roller 132 is connected (below the plane of surface 102) by drive belt 136 to a clutch/brake mechanism 138. Clutch/brake mechanism 138 is in turn connected by belt 139 to feeder motor 140. When the feeder motor 140 is activated and the clutch brake is energized, the first feeder roller 132 rotates about its vertical axis in the direction shown by arrow 141, thereby imparting clockwise momentum to the endless belt 130 entrained about rollers 132 and 134. Roller 134 is an idle roller, which rotates about its vertical axis as endless belt 130 moves in its clockwise direction. As described hereinafter, as the endless belt 130 moves in the clockwise direction, the endless belt 130 contacts a first surface (i.e., a first sidewall) of the leading envelope 86A in the input magazine and exerts a force vector on the envelope 86A in the feed direction (shown by arrow 88), with the result that belt 130 imparts momentum to envelope 86A toward the singulation region 73.

As indicated above, the singulation region 73 comprises a first-stage and a second stage. A first stage singulation gap 142, seen in FIG. 16, is defined between the first stage singulation means 74 and the belt 130 of feeder 72. A second stage singulation gap 143 is defined between the rollers 75 and 76.

The first stage singulation means 74 includes disc-shaped singulation stones 144A and 144B. The singulation stones 144A and 144B are secured to opposite ends of a vertical shaft 145 which extends through the centers of the stones 144A and 144B. Shaft 145 is, in turn, carried by a lever arm 146. The lever arm 146 pivots about studs 147A and 147B. Studs 147A and 147B are mounted to the horizontal magazine surface 102. The lever arm 146 pivots about studs 147A and 147B through link members 148A and 148B and associated link pins 149A and 149B.

The lever arm 146 carries a rotatable nylon roller 150. The nylon roller 150 is rotatably mounted on a second vertical shaft 151. The shaft 151 is carried on lever arm 146 so that the axis of shaft 151 and roller 150 are closer to the feeder 72 (in the sense of the direction of arrow 42) than are shaft 145 and the axis of stones 144A and 144B; and so that the axis of shaft 151 and roller 150 is more upstream (in the sense of the direction of arrow 88) than are shaft 145 and the axes of stones 144A and 144B. With the shafts 145 and 151 so positioned, the periphery of roller 150 is further upstream (in the sense of the direction of arrow 88) than are the peripheries of stones 144A and 144B.

The first stage singulation means 74 is biased in the direction of the feeder 72 (i.e., in the direction of arrow 42) by biasing means 152. Biasing means 152 comprises biasing spring 153, a first end of which is secured to the link member 148A and a second end of which is secured to anchor block 154. Anchor block 154 is in turn secured to the horizontal magazine surface 102. Anchor block 154 carries a threaded adjustment screw 155. The adjustment screw 155 has a head which bears against an extended portion of link member 148A. The relative position of the head of adjustment screw serves as a limit for the biasing means 152, and thus controls the width of the first singulation gap 142.

In the vicinity of the stones 144A, 144B the lever arm 146 carries two-wing members 156A, 156B. Wing members 156A, 156B straddle the roller 76 and thus prevent thin envelopes from wrapping around the roller 76 in the reverse direction.

Turning now to the second stage singulation gap 143, the roller 76 is a compliant roller having a circumferential surface that touches roller 75. Both rollers 75 and 76 are rotatable about corresponding fixed vertical axes. As shown in FIG. 2, roller 75, also known as the "pull-out" roller, is oriented so that its circumferential surface contacts the first flat side of an envelope 86 as the envelope 86 goes through the second stage singulation gap 143. Roller 76, positioned just across gap 143 from roller 75, is oriented so that its circumferential surface contacts the second, or opposite, side of the envelope 86.

Downstream from the rollers 75 and 76 along the feed direction (indicated by arrow 88) is a second pair of rollers, particularly third roller 157 and fourth roller 158. Like rollers 75 and 76, rollers 157 and 158 are oriented for rotation about fixed vertical axes. Roller 157 is situated to contact the first side of envelope 86; roller 158 is situated to contact the second side of envelope 86.

Roller 157 is continuously rotationally driven in the clockwise direction by virtue of its connection (via belt 159) to motor 160. The rotational motion of roller 157 is transmitted to pull-out roller 75 by belt 161 so that roller 75 rotates in the clockwise direction.

In the embodiment of FIG. 2, the roller 76 is connected via belt 162 and slip clutch 164 (positioned beneath roller 76) to the power drive for roller 157. As described hereinafter, in the event a tendency for a multiple feed is detected, the roller 76 can be rotated in the clockwise direction to repel any second envelope (such as envelope 86B in FIG. 1) that might attempt to simultaneously enter the second stage singulator gap 143, along with the leading envelope (i.e., envelope 86A). In another unillustrated embodiment, the roller 76 is merely an idler roller which is not connected to roller 157.

Two detectors are positioned downstream from the singulation gap 78, particularly singulator blockage detector 170 and singulator clearance detector 172. The singulator blockage detector 170 comprises photocell transmitter 174 and photocell receiver 176 oriented to direct a beam 178 transverse to the direction of feed transport 88. The beam 178 crosses the direction of feed transport 88 at a point downstream from rollers 75 and 76 whereby, when a leading edge of an envelope trips the beam 178, an envelope is travelling through the second stage singulator gap 143.

The singulation clearance detector 172 comprises photocell transmitter 180 and photocell receiver 182 oriented to direct a beam 184 transverse to the direction of feed transport 88. The beam 178 crosses the direction of feed transport 88 at a point downstream from rollers 157 and 158.

The photocell receivers 176 and 182 are connected by lines 186 and 188, respectively, to input ports of a signal controller 190. The signal controller 190 has output ports connected by lines to various devices controlled thereby, including line 192 connected to the clutch/brake mechanism 138 associated with feeder 72. As indicated by its description hereinafter, to the extent utilized by the present invention, the signal controller 190 basically serves to time the application of signals to the mechanisms controlled thereby, and thus comprises conventional circuitry well understood by the man skilled in the art.

In one embodiment, the signal control receives signals from the reader means 50 as an indication of the frequency of envelopes clearing the singulator region 73, rather than receiving signals from the singulator clearance detector 172.

The transport system 62 of the processing/transport section begins in the neighborhood of the singulator clearance detector 172. That is, the rotatable horizontal belt 64 and the vertical belts 66 and 68 are positioned to catch articles fed from between roller pair 150, 152 and to direct the articles along the processing/transport section 24 in the direction of arrow 44.

Figure 4:
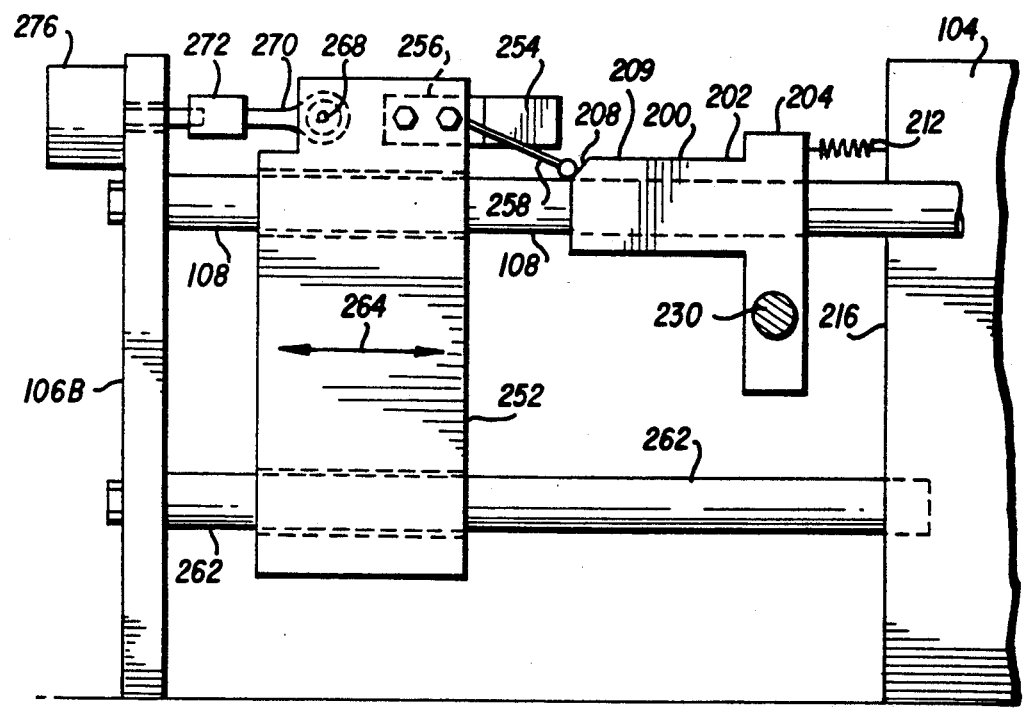
FIG. 4 is a side view of an assist displacement control device of the feeder section of the embodiment of FIG. 2 taken along the line 4—4.

The feed assist means 80, also known as the "helping hand", includes a feed assist carriage 200 that comprises an essentially cylindrical member 202. The major cylindrical axis of cylindrical member 202 is parallel with the input transport direction 42. A first end of the cylindrical member 202 has a rectangular plate member 204 fastened thereto. Plate member 204 lies in a plane orthogonal to the major cylindrical axis of cylindrical member 202. A second end of the cylindrical member 202 has a pair of cam surfaces 206 and 208 formed thereon. As shown in FIG. 2, cam surface 206 is a planar surface that is essentially orthogonal to the magazine top surface 102. As seen in FIG. 4, cam surface 208 is a planar surface that is angularly inclined with respect to the magazine top surface 102. At its second end near cam surface 208, the top of the cylindrical member is slightly beveled as at 209 to be essentially parallel with the horizontal.

The cylindrical member 202 and the rectangular plate member 204 comprising the feed assist carriage 200 have an aligned aperture extending therethrough which loosely accommodates the guide rod 108, whereby the feed assist carriage 200 is translatable to and fro along the guide rod 108 in the input transport direction indicated by arrow 42. The rectangular plate member 204 of the carriage 200 has a pin 210 anchored therein. A first end of a biasing spring 212 securely engages pin 210. A second end of the biasing spring 212 securely engages a similar pin 214 anchored in the envelope guide wall 104, with the result that biasing spring 212 tends to pull the feed assist carriage 200 toward a blunt stop end 216 of the envelope guide wall 104. The stop end 216 of envelope guide wall 104 serves as a stop for limiting the degree of travel of the feed assist carriage 200 in the direction which is the reverse of the input transport direction 42.

Figure 3:
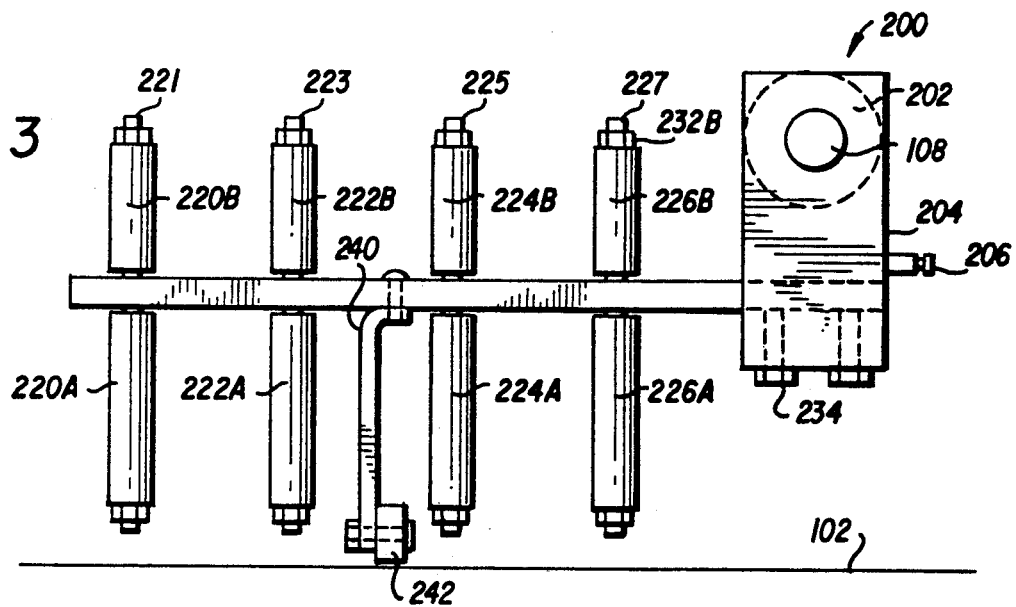
FIG. 3 is a front view of a feeder assist device of the feeder of the embodiment of FIG. 1.

As shown in FIGS. 2 and 3, the feed assist means 80 has a plurality of envelope-contacting rollers provided thereon. In particular, the feed assist means 80 features roller pair 220A and 220B mounted on vertical post 221; roller pair 222A and 222B mounted on vertical post 223; roller pair 224A and 224B mounted on vertical post 225; and, roller pair 226A and 226B mounted on vertical post 227. The posts 221, 223, 225, and 227 are held aloft by affixation near their midpoints to a cross beam 230. Each roller is rotatable on its respective post, but is held captive thereon by retaining rings, such as retaining rings 232A and 232B shown on post 227 in FIG. 3. Cross beam 230 is anchored into rectangular plate member 204 of the feed assist carriage 200, and is retained therein by set screws 234.

Near its midpoint, the cross beam 230 of the feed assist carriage 200 is supported by a vertical leg 240 that has a wheel 242 rotatably mounted at the distal end thereof. Wheel 242 rides on the input magazine top surface 102.

A feeder switch 244 is positioned so that a feeler arm 245 thereof can ride on cam surface 206 of the feed assist carriage 200 under normal operating conditions, i.e. when the feeder 72 should be intermittently feeding envelopes 86 toward the singulator gap 78. The feeder switch 244 is connected by line 246 to the signal controller 190. The signal controller 190 is connected by line 247 and 248 to the feeder motor 142 and to the roller motor 156, respectively.

The assist displacement control means 84 comprises means for changing the degree of pressure bearing against the feed assist means 80, and in particular comprises switch carriage means 250. As shown in FIGS. 2 and 4, switch carriage 250 is an essentially rectangular block 252 that carries a switch 254 on support bracket 256. Switch 254 is carried on carriage 250 so that a feeler arm 258 included in the switch 254 can ride on the cam surface 208, or on the beveled top surface 209 of the feeder assist carriage 200. The switch 254 is connected by electrical line 260 to the motor 118 of the input transport means 110.

As mentioned before, the guide rod 108 extends from post 106A near the entrance to the input magazine 70 to post 106B near the rear of the apparatus. Post 106B also carries a rear end of second guide rod 262. A front end of second guide rod 262 is anchored in the envelope guide wall 104 near stop end 216 thereof. As shown in FIG. 4, the second guide rod 262 is directly beneath, but considerably lower in elevation than, the guide rod 108. The feed assist carriage 200 rides sufficiently aloft on the guide rod 108 so that the second guide rod 262 poses no obstacle for the movement of the carriage 200.

The rectangular block 252 of the switch carriage 250 has apertures provided therein for receiving the upper guide rod 108 and the lower guide rod 262, and for permitting the rectangular block 252 to translate in the directions shown by double-headed arrow 264.

Near its top, the rectangular block 252 of switch carriage 250 has a channel 266 formed therein. The channel 266 is bridged by a cross member 268. The cross member 268 has a clevis 270 rotatably secured thereto. A distal end of the clevis 270 is anchored in a first side of a coupling block 272. A second side of the coupling block 272 is connected to an output piston 274 of a stepper motor 276. The output piston 274 of stepper motor 276 is of the type that extends and retracts in the direction of arrow 264 in accordance with signals produced by the stepper motor 276. The stepper motor 276 is mounted on the post 106B. The post 106B has an aperture formed therein to accommodate the output piston 274 of stepper motor 276, so that the output piston 274 can connect to the coupling block 272. As shown in FIG. 2, input terminals of the stepper motor 276 are connected by line 278 to output ports of the signal controller 190. Line 278 carries signals thereon which dictate whether the output piston 274 of stepper motor 276 is to extend or retract, and thus whether the switch carriage 250 is to travel toward or away from the input magazine 70.

It will be seen hereinafter that the assist displacement control means 84, including the switch carriage 250 and the input transport means 110 connected thereto, serves to control the displacement of the feed assist means 80 by changing the degree of pressure bearing against the feed assist means 80. The signal controller 190 determines whether the position of the feed assist means 80 should be changed by examining the time elapsed since the last feed of an envelope through the singulator region 73. If that elapsed time exceeds a predetermined time, the stepper motor 276 retracts the switch carriage 252. With retraction of the switch carriage 252, the motor 118 of the input transport means 110 is energized, with the result that envelopes are further advanced toward the feed assist means 80, thereby pushing the feed assist means 80 further in the direction of the input transport direction 42.

Figure 9:
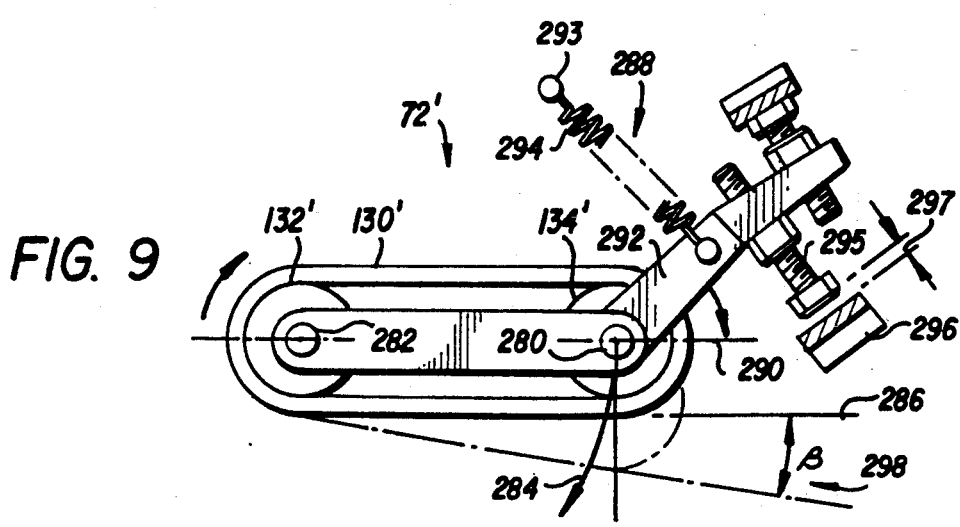
FIG. 9 is a partial top view of a feeder belt assembly of a feeder section according to another embodiment of the invention.

The feeder 72' of the embodiment of FIG. 9 differs from the feeder 72 of the embodiment of FIG. 2 in several respects. Unlike the roller 134 of the FIG. 2 embodiment, roller 134' of FIG. 5 does not have a fixed vertical axis about which it rotates. Rather than being anchored to the surface 102, the vertical axis 280 of roller 134' is freely suspended above the surface 102, with the result that the entire assembly comprising rollers 132', 134', and endless belt 130', can pivot or swing about vertical axis 282 in the direction of arrow 84. The pivoting of the feeder assembly in this manner results from the force vector occassioned by the revolution of endless belt 130'. Accordingly, the belt 130' swings beyond its former position (shown as plane 286 in FIG. 9) and toward the leading envelope in the input magazine 70.

The feeder 72' of the embodiment of FIG. 9 also further includes biasing means 288 for biasing the roller 134' so that the axes 282 and 280 of rollers 132' and 134' are in the plane (plane 290 being parallel to plane 286). The biasing means 288 includes a bracket 292 upon which roller 134' is rotatably mounted. Bracket 292 is urged toward a vertical post 293 by a spring 294.

The feeder 72' of the embodiment of FIG. 9 also includes means for limiting the degree of pivotal motion of the feeder 72' away from plane 286. In this regard, the bracket 292 carries an adjustment screw 295 thereon. The head of adjustment screw is aligned with a vertical stop member 296. The size of the gap 297 separating the head of adjustment screw 295 and the stop member 296 when the feeder 72' is braked is equal to the maximum component (along the direction of input transport) of the displacement of feeder 72' from the plane 286. Thus, distance 297 equals distance 298.

STRUCTURE STACKER SECTION

Figure 5:
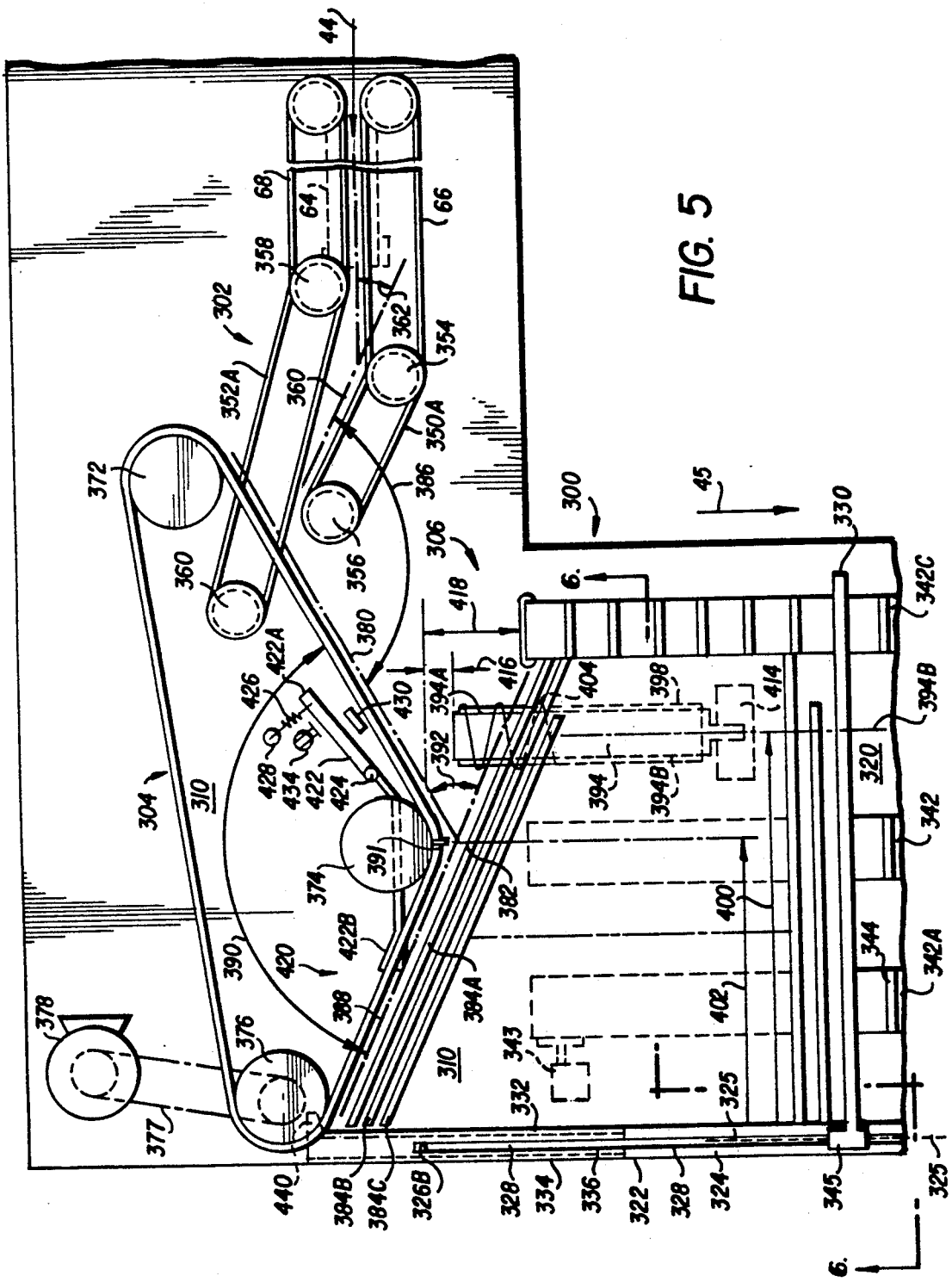
FIG. 5 is a top view of a stacker section of the feeder and stacker apparatus of the embodiment of FIG. 1.

As shown in FIG. 5, the stacker section 38 of the envelope processing system comprises a discharge magazine 300; introductory conveying means 302; stacker conveying means 304; and, means 306 for displacing a trailing edge of a flat article. The stacker section 38 of the envelope processing system is downstream from the processing/transport section 24 to receive envelopes transported on-edge thereto by the transport system 62 of the processing/transport section 24. FIG. 5 shows how the horizontal belt 64 and the vertical belts 66 and 68 of the transport section 62 transport belts toward the stacker section 38.

The stacker section 38 has a horizontal stacker floor surface 310 which is at substantially the same elevation as both the feeder magazine surface 102 of the feeder section 40 and the plane of the upper course of travel of the horizontal belt 64 of the processing/transport section 24. As will be described hereinafter, the introductory conveying means 302 and the stacker conveying means 304 of the stacker section 38 are primarily positioned above the stacker floor surface 310, with driving elements thereof being located beneath the surface 310.

The discharge magazine 300 comprises a magazine floor 320; magazine abutment means 322; and, article discharge transport means 324. The discharge magazine floor 320 is co-planar with the stacker floor surface 310. The magazine abutment means 322 is vertically mounted on the magazine floor 320 along the left-most edge thereof as seen in FIGS. 5 and 6, and thus has an axis of elongation 325 that extends parallel to the direction of discharge transport as indicated by arrow 45.

Figure 6:
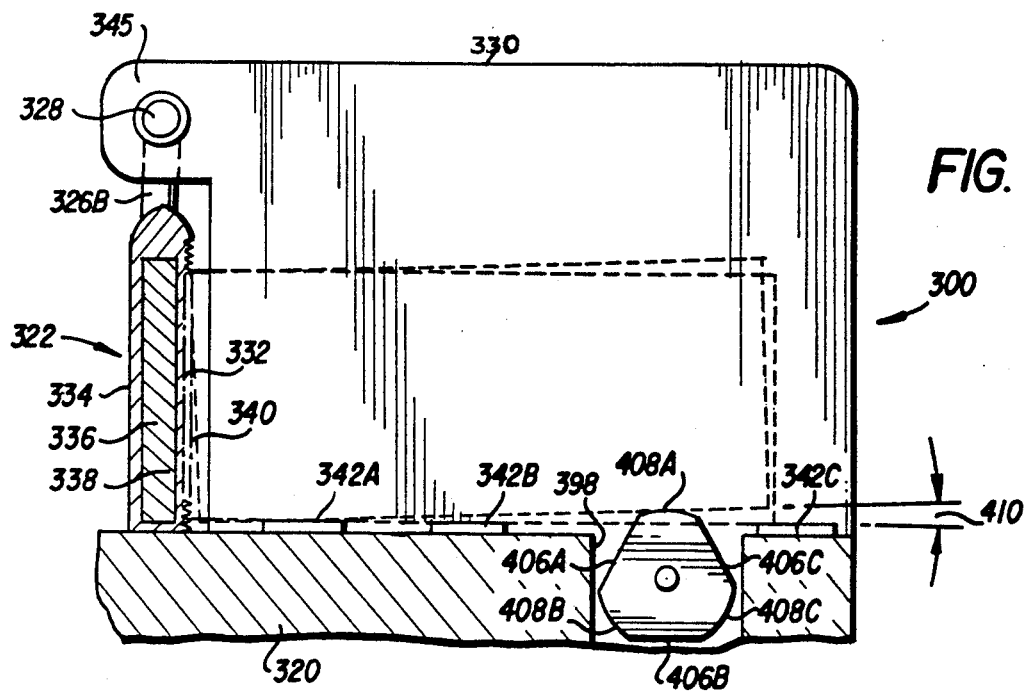
FIG. 6 is a front cross-sectional view of a discharge magazine taken along the line 6—6 of the stacker section of the embodiment of FIG. 5.

The discharge magazine abutment means 324 carries two vertically upstanding posts, particularly posts 326A and 326B (only post 326B being illustrated in FIGS. 5 and 6. Posts 326A and 326B function in analogous manner to posts 106A and 106B of the feeder section 40, i.e., to hold aloft a horizontal guide rod. Thus, posts 326A and 326B hold aloft guide rod 328. As described hereinafter, guide rod 328 serves essentially the same type of function as does guide rod 108 of the feeder section 40, and in particular serves as a guide for compression plate 330.

As shown in both FIGS. 5 and 6, the discharge magazine abutment means 322 is an elongated plate member which has a first exterior wall 332 and a second exterior wall 334, both exterior walls 332 and 334 extending parallel to the axis of elongation 325. As shown in FIGS. 5 and 6, the first exterior wall 332 faces toward the right and is contactable by envelopes, while the second exterior wall 334 faces toward the left. The exterior walls 332 and 334 define an elongated central cavity 336 therebetween, which, as best shown in FIG. 6, is filled with acoustic insulation material.

As also shown in FIG. 6, the first exterior wall 332 of the magazine abutment means 322 has a plurality of parallel, horizontally extending ridges 340 along the length thereof. As described hereinafter, the ridges 340 of the exterior wall 332 are contactable by envelopes being transported in the discharge magazine 330 and serve as bearing points to decrease frictional drag between the envelope edges and the abutment means 322.

The article discharge transport means 324 of the discharge magazine 300 resembles the input transport means 110 of the feeder section 40. In this regard, discharge transport means 324 comprises three transport belts 342A, 342B, and 342C which have upper courses of travel that lie essentially in, or just above, the plane of the magazine floor 320. Although the drive mechanism of the transport belts 340 is not fully shown, it should be understood that, like the belts 112A, 112B, 112C of feeder section 40, the transport belts 342A, 342B, 342C entrain pulleys that are commonly driven by motor 343. Moreover, the belts 342A, 342B, 342C, like the belts 112A, 112B, 112C, are elastomeric timing belts having teeth 344 provided thereon at regularly spaced intervals.

As mentioned above, the compression plate 330 of the stacker section 38 travels along the guide rod 328 in like manner as compression plate 124 travels along guide rod 108. To this end, the compression plate 330 has a sleeve 345 which fits over and is rotatable about the guide rod 328. When in its natural orientation, the bottom edge of the compression plate 330 rides on the transport belts 342 for travel away from the stacker section 38 in the direction depicted by arrow 45. The compression plate 330 thus forms a surface against which a sidewall of a first flat article, once it is discharged from the stacker section 38, can vertically contact.

The introductory conveying means 203 of the stacker section 38 comprises two pairs of revolving vertically oriented O-rings, particularly introductory front rings 350A and 350B and introductory rear rings 352A and 352B. The introductory front rings 350A and 350B are each entrained about vertically upstanding pulleys 354 and 356, while the introductory rear rings 352A and 352B are each entrained about vertically upstanding pulleys 358 and 360.

Figure 7:
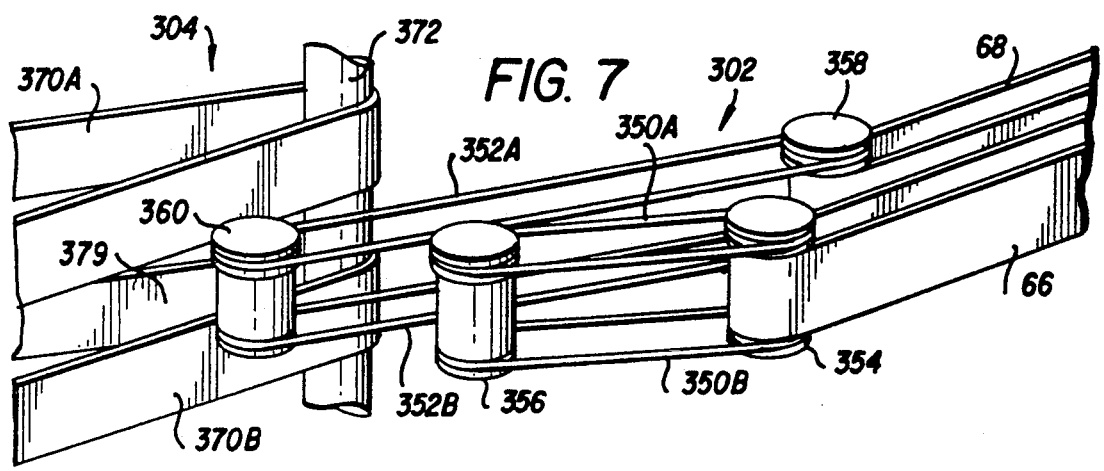
FIG. 7 is a front isometric view showing portions of introductory conveying means and stacker conveying means included in the stacker section of the embodiment of FIG. 5.

As shown in FIGS. 6 and 7, the O-ring pair 350A, 350B is entrained about the same pulley 354 as is the front vertical belt 66 of the processing/transport section 24. To accommodate the common entrainment, belt 66 extends around a midportion of the pulley 354, while the O-ring 350A extends around a top portion of the pulley 354 and the O-ring 350B extends around a bottom portion of the pulley 354. The O-ring pair 352 is similarly entrained along with rear vertical belt 68 on the pulley 358. Although not shown, it should be understood that pulleys 354 and 356 are continuously driven by motors in the same manner as are other pulleys and rollers described herein, which motors are positioned beneath the stacker floor surface 310.

As shown in FIG. 5, the pulleys 356 and 360 are so positioned that the O-ring pairs 350, 352 direct flat articles travelling on-edge therebetween along a linear introductory path indicated by broken line 360. As seen from above in FIG. 5, the linear introductory path 360 is oriented at an acute angle 362 with respect to the direction (indicated by arrow 44) of transport through the processing/transport section 24. The O-ring pairs 350, 352 comprising the introductory conveying means 302 thus direct articles travelling on-edge therebetween so that a leading edge of each article contacts the stacker conveying means 304.

The stacker conveying means 304 includes a pair of stacker belts 370A, 370B which serve to direct articles travelling on-edge to the discharge magazine 300. Each stacker belt 370A and 370B extends around a trio of vertically upstanding rotatable pulleys 372, 374, and 376. The stacker belt 376 is rotatably driven in the clockwise direction by virtue of its connection (via belt 377) to motor 378. Accordingly, the pulleys 374 and 376 also rotate in the clockwise direction, and the stacker belts 370 travel in the clockwise sense about the pulleys they entrain.

Each of the pulleys 372, 374, and 376 are mounted on the stacker floor surface 310, so that their axes of rotation are perpendicular to the floor surface 310. As shown in FIG. 7, stacker belt 370A extends around a top portion of the pulleys while stacker belt 370B extends around a top portion of the pulleys, thereby providing a gap 379 between the stacker belts 370A and 370B.

As shown in FIG. 5, the pulleys 372, 374, and 376 are positioned so that the stacker belts 370 acquire an essentially triangular course of travel about the pulleys. As part of this triangular course of travel, the stacker belts 370 direct articles delivered thereto along a first linear path segment (indicated by broken line 380) toward a midsection, such as midsection 382 of envelope 384A, of a previously stacked article in discharge magazine 300. As used herein, the midsection of an article means a section of the article proximate the pulley 374 after the article has just been stacked in the discharge magazine 300. As shown in FIG. 5, the first linear path segment 380 formed by the stacker belts 370 extends between pulleys 372 and 374, and is oriented at an obtuse angle 386 with respect to the linear introductory path 360 provided by the introductory conveying means 302.

As another part of the triangular course of travel, the stacker belts 370 define, between pulleys 374 and 376, a second linear path segment (indicated by broken line 388). As shown in FIG. 5, the second linear path segment 388 is oriented at an obtuse angle 390 with respect to the first linear path segment 380. The first linear path segment 380 and the second linear path segment 388 intersect at a bend point 391. At bend point 391 the tangent of the stacker belts 370 relative to pulley 374 is essentially orthogonal to the direction of discharge conveyance 45.

As described hereinafter, when a flat article such as an envelope is conveyed by the stacker belts 370, the leading edge of the article is initially directed along the first linear path segment 380 to the midsection 382 of a previously stacked article. Upon reaching midsection 382 and pulley 374, the leading edge of the article bends through the obtuse angle 390 as the article becomes interposed between the stacker belts 370 and the previously stacked article, by virtue of the stacker belts 370 directing the article along the second linear path segment 388. As the leading edge of the article is so bent around the pulley 374, the trailing edge of the article is displaced through the angle 392, with the result that the trailing edge of the article essentially "fishtails" away from the first linear path segment 380.

The fishtailing, or angular displacement, of the trailing edge of a flat article in the manner just described is further facilitated by positioning element 394. Positioning element 394 is a rotatable element having a major axis of rotation 396. The axis of rotation 396 extends parallel to the axis of elongation 325 of the abutment means 322, and hence is essentially parallel to the discharge direction indicated by arrow 45. The axis of rotation 396, as seen in FIG. 6, is just slightly beneath the floor 320 of the discharge magazine 300. The floor 320 of the discharge magazine 300 has an elongated slot formed therein to accommodate the positioning element 394.

The axis of rotation 396 of the rotatable element 394 is separated by a distance 400 from the axis of elongation 325 of the abutment means 322. Since the axes 396 and 325 are parallel, the distance 400 is understood to be the perpendicular distance between those two axes. The bend point 391 is separated from the axis of elongation 325 of the abutment means 322 by a distance 402. As shown in FIG. 5, the distance 400 is greater than the distance 402, which means that the axis of rotation 396 of the positioning element 394 is separated from the axis of elongation 325 of the abutment means 322 by a greater distance than is the midpoint 382 of a flat article at the bend point 391.

The positioning element 394 includes a first portion 394A and a second portion 394B. The first portion 394A has exterior threads 404 thereon which extend slightly above the plane of the magazine floor 320 to engage bottom edges of flat articles. The second portion 394B has a plurality of chord-like surfaces 406A, 406B, and 406C formed on the exterior thereof. Between the chord-like surfaces 406 are provided arcuate surfaces 408A, 408B, and 408C. When the chord-like surfaces 406 are parallel to the magazine floor 320, the surfaces 406 essentially lie in the plane of the magazine floor 320. However, when the chord-like surfaces 406 are not parallel to the magazine floor 320, the arcuate surfaces 408 on the periphery of the second portion 394B extend slightly above the plane of the magazine floor 320. As shown in FIG. 6, when an arcuate surface 408 extends above the plane of the magazine floor 320, the bottom edge of a flat article resting thereon is displaced, or slightly elevated, above the magazine floor 320 through an angle 410. Elevating an article in this manner permits the leading edge of the article to fall by gravity toward the abutment means 322 for better registration thereagainst.

The positioning element 394 rotates about its axis of rotation 396 by virtue of its connection to a rotating shaft of motor 414. As shown in FIG. 5, motor 414 is located beneath the magazine floor 320.

The positioning element 394 is situated closer to the bend point 391 than are the discharge transport belts 342. That is, with respect to the direction of discharge as depicted by arrow 45, the distance 416 separating the positioning element 394 from the bend point 391 is less than the distance 418 separating the discharge belts 342 from bend point 391. Thus, the first portion 394A of the positioning element 394 is optimally located to engage trailing edges of flat articles as the articles are interposed between a previous article in the stack and the stacker belts 370 along the second linear path segment 388.

As mentioned above, the gap 379 is provided between the stacker belts 370A and 370B. The gap 379 is sized to accommodate the O-ring 352A of the introductory conveying means which, as shown in FIG. 5, must extend into the interior of the triangular course of travel of stacker belts 370.

The stacker section 38 also includes a stack sensor means 420 for controlling the discharge transport means 324, particularly the transport belts 342. The stack sensor means 420 comprises a horizontal sensor lever arm 422 that is carried by a vertically upstanding pivot post 424. Pivot post 424 is mounted on the stacker floor surface 310 so that the lever arm 422 can pivot thereabout. The lever arm 422 has a first end 422A and a second end 422B. The first end 422A of the sensor lever arm is resiliently biased in the counter-clockwise direction with respect to pivot post 424 by virtue by biasing means 426. In the illustrated embodiment, biasing means 426 is a spring having a first end which engages the first end 422A of the sensor lever arm and a second end which is secured to a vertically upstanding stationary post 428. The biasing means 426 serves to urge the sensor lever arm 422 in the counter-clockwise direction away from a microswitch 430. Microswith 430 is connected by an unillustrated electrical lead to the drive motor 343 for the discharge transport belts 342A, 342B, 342C. Stop member 430 provides a limit to the extent of counter-clockwise rotation about the pivot post 424.

The second end 422B of the sensor lever arm extends through the gap 379 provided between the stacker belts 370A and 370B in the vicinity of the second linear path segment 388. The distal end of the end 422B thus bears against the rear sidewall of the flat article most recently interposed between a previous article and the stacker belts 370. When a sufficient number of flat articles are stacked in the discharge magazine 300, the articles exert sufficient force on the second end 422B of the sensor lever arm to cause the sensor lever arm 422 to rotate in the clockwise direction about the pivot post 424. If this clockwise force is great enough, the first end 422A of the sensor lever arm will overcome the bias exerted by the spring 426, and will contact the microswitch 430. When so contacted, the microswitch 430 sends an electrical signal to activate the discharge transport drive motor 343. When activated, the discharge transport drive motor 343 causes the transport belts 342A, 342B, 342C carrying flat articles and the compression plate 330 thereon to be transported further in the discharge direction as depicted by arrow 45.

The abutment means 322 of the stacker section 38 has a stripper means 440 provided thereon at its end proximate the pulley 376. As shown in FIG. 5, the stripper means 440 is a foot-like member which projects beyond the plane of the first exterior wall 332 of the abutment means 322. The foot-like stripper member 440 extends between the stacker belts 370A and 370B and into the gap 379. The stripper member 440 thus serves to preclude a leading edge of a flat article from being further conveyed by the stacker belts 370 around the pulley 376.

STRUCTURE PRINTHEAD MOUNT ASSEMBLY

Figure 15A:
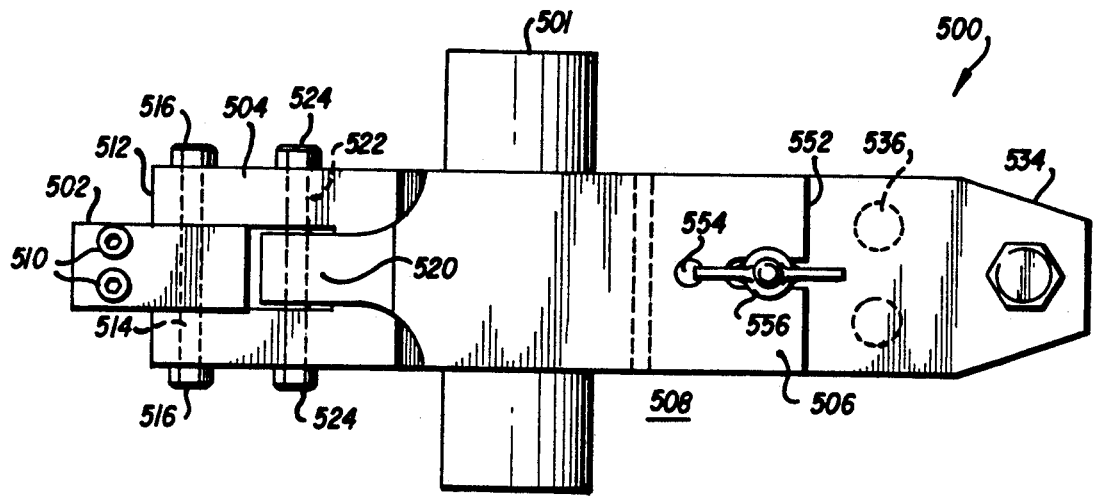
FIG. 15A is a top view of a printhead mount assembly according to an embodiment of the invention.
Figure 15B:
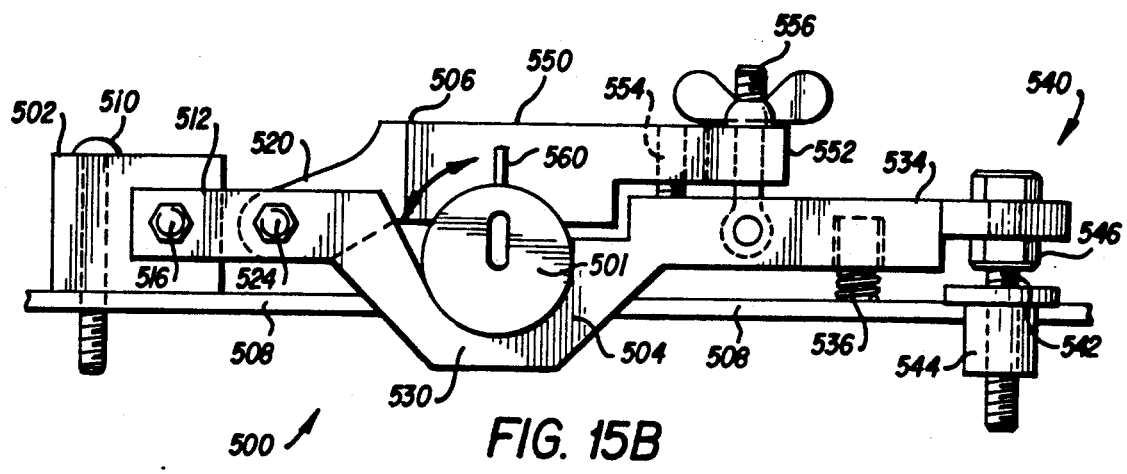
FIG. 15B is a side view of the printhead mount assembly of FIG. 15A.

FIGS. 15A and 15B show a printhead mount assembly 500 according to an embodiment of the invention. The printhead mount assembly 500 is located at the bar code printer 54 station along the processing-transport section 24. The printhead mount assembly 500 functions to lock the printhead 501 of the ink jet printer into a predetermined position suitable for the printing operation.

The printhead mount assembly 500 includes an anchor block 502; a bottom clamp member 504; and, a top clamp member 506. The anchor block 502 is securely fastened to a predominately planar horizontal surface 508 by two fasteners 510.

The bottom clamp member 504 has two yoke legs 512 which straddle the anchor block 502. A pivot rod 514 having threaded ends extends through aligned apertures in the anchor block 502 and the yoke legs 512. Lock nuts 516 are provided on each threaded end of the pivot rod 514. When the lock nuts 516 are loosened, the bottom clamp member 504 can pivot about the pivot rod 514. Tightening the nuts 516 locks the position of the bottom clamp member 504 relative to the anchor block 502.

A tongue 520 of the top clamp member 506 extends downwardly into a space formed between the two yoke legs 512 of the bottom clamp member 504. The tongue 520 is positioned between the two yoke legs 512 by virtue of the extension of a pivot rod 522 through aligned apertures in the two yoke legs 512 and the tongue 520. Like pivot rod 514, the pivot rod 522 has threaded ends which receive lock nuts 524. As is understandable by the analogous description aboye of the pivot rod 514, the pivot rod 522 facilitates pivotal motion of the top clamp member 506 with respect to the bottom clamp member 504.

The bottom clamp member 504 has a central region 530 which has an essentially truncated, flat-bottomed "V"-shape, as seen in FIG. 15B. The flat bottom of the central region 530 extends below the surface 508 into a mating channel suitably shaped to receive region 530. The interior of the "V"-shaped central region 530 is partially curved to receive the bottom of the cylindrically-shaped printhead 501.

A distal portion 534 of the bottom clamp member 504 has a pair of compression springs 536 sandwiched between the underside thereof and the horizontal surface 508. At its furtherest extreme, the distal portion 534 carries a vertical adjustment means 540. The vertical adjustment means 540 includes an adjustment bolt 542 which extends through the distal portion 534; through a plastic collar 544; and, into the horizontal surface 508 where it is threadingly anchored. A threaded lock nut 546 is carried on the shaft of the adjustment bolt 542. Movement of the lock nut 546 selectively controls the altitude of the lower clamp member 504, and of the entire printhead mount assembly 500, above the surface 508.

The top clamp member 506 has a central portion 550 which overlies the printhead 501 clamped therebeneath A distal portion 552 of the top clamp member 506 carries both a set screw 554 and a fastener 556. A first end of the fastener 556 is anchored into the upper surface of the distal portion of the lower clamp member 504. A second end of the fastener 556 carries a wing nut 558. The set screw 554 has a distal end which bears against the upper surface of the distal portion of the lower clamp member 504.

Adjustment of the adjustment bolt 542 of the vertical adjustment means 540 controls the height of the bottom clamp member 504 with respect to the surface 508. In this respect, adjustment of the bolt 542 permits the bottom clamp member 504 to pivot about the axis of the pivot rod 516. Adjustment of the set screw 554 controls the height of the top clamp member 506 relative to the bottom clamp member 504. In this respect, adjustment of the set crew 554 permits the top clamp member 506 to pivot about the axis of the pivot rod 522.

As shown in FIG. 15B, the top clamp member 506 has a registration mark 560 provided thereon to facilitate the angular orientation of the printhead 501. In this respect, when the printhead is in a correct position, a corresponding mark on the printhead lines up with the registration mark 560 provided on the top clamp member 506. In this manner, after the printhead 501 has been removed and serviced, the proper angular positioning of the printhead 501 can rapidly be reacquired.

STRUCTURE READ WINDOW

Figure 13A:
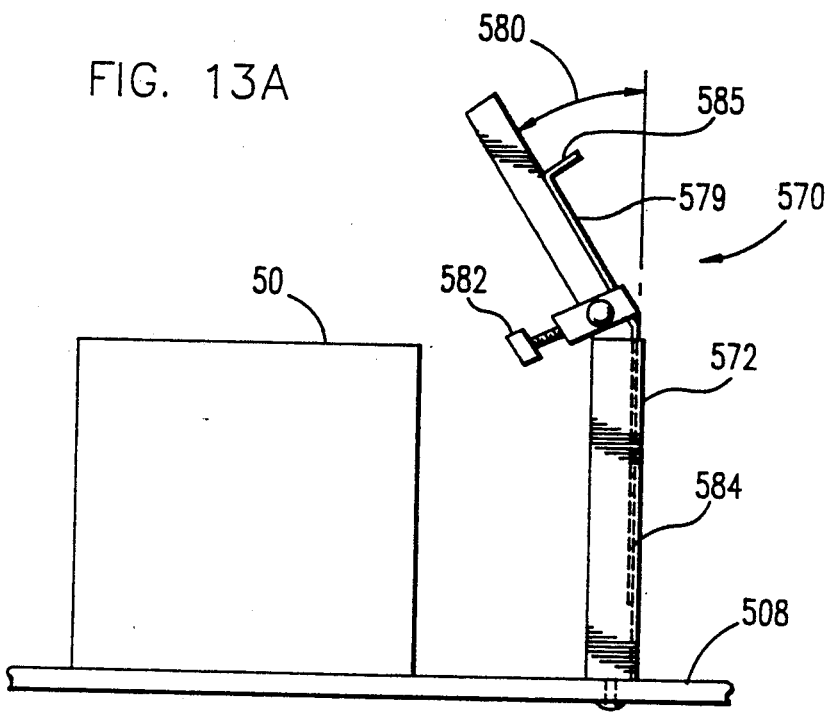
FIG. 13A is a side view of an adjustable read window device and reader mount according to an embodiment of the invention.
Figure 13B:
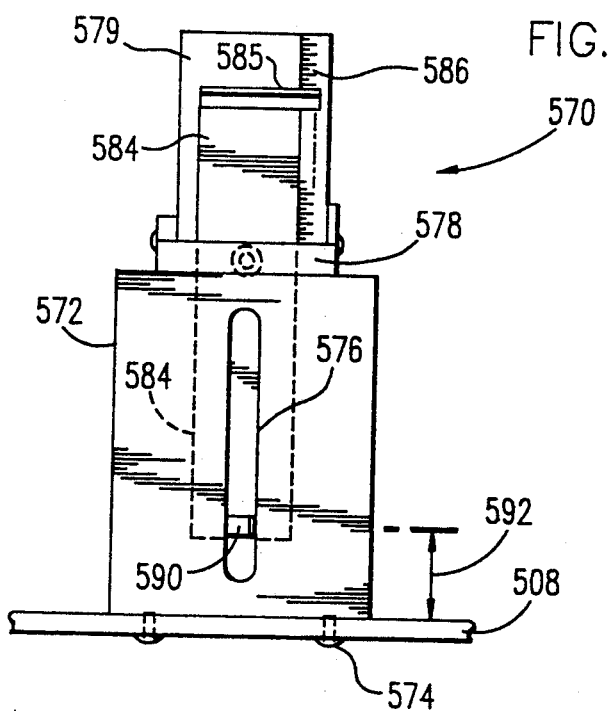
FIG. 13B is a front view of the adjustable read window device of FIG. 13B.
Figure 13C:
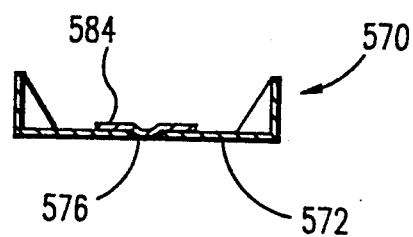
FIG. 13C is a top view of the adjustable read window device of FIG. 13A.

FIGS. 13A-13C show a read window assembly 570 utilized in conjunction with the reader means 50 along the processing/transport section 24. The read window 570 includes a vertical base member 572 which is anchored to the planar horizontal surface 508 by fasteners 574. As shown in FIG. 13A, the read window assembly 570 is positioned on the planar horizontal surface 508 between the reader 50 and the path 26 of transit of envelopes. The vertical base member 572 has a narrow, elongated slot or "read window" 576 formed therein.

At its top, the vertical base member 572 carries a block 578 and a top extension 579. The block 578 and flange 579 are slightly angled with respect to the vertical as shown by angle 580. Block 578 has a slot formed therein for a purpose described below, and accomodates a thumb screw 582 having a shank oriented towards the slot.

A narrow spring steel plate or slide 584 slidably extends behind the vertical base member 572 and through the slot formed in the block 578. The bottom portion of the plate 584 is extruded, or "dimpled" as seen from above in FIG. 13C, to fit into the read window 576. The spring steel plate 584 is captivated in the block 578 as the thumb screw 582 bears against the plate 584 in the slot of the block 578. Captivity of the plate 584 by the block 578 causes the slide to assume an angular orientation at the top of the vertical base member 572. The spring steel plate 584 is painted white At its very top, the spring steel plate 584 has an outwardly-turned flange 585 provided thereon.

The slidability of the slide 584 in the elongated slot 576 facilitates size adjustment of the read window.

The top extension 579 of the vertical member 572 has indicia 586 of increments of scale provided therealong. The alignment of the top flange 585 of the plate 584 with a particular indicia 586 of the increments of scale reflects the distance from the bottom edge of an on-edge envelope to the bottom edge 590 of the plate 584 (that is, the height 592 of the read window as shown in FIG. 13B).

The extruded or dimpled shape of the plate or slide 584 in the read window 576 serves to eliminate shadows which otherwise could be erroneously interrpreted by the read device as characters. The angular orientation of the slide or plate 584 about the angle 580 advantageously eliminates any collision between the slide 584 and envelopes in transit.

STRUCTURE: READ WINDOW SET-UP GUIDE

Figure 14:
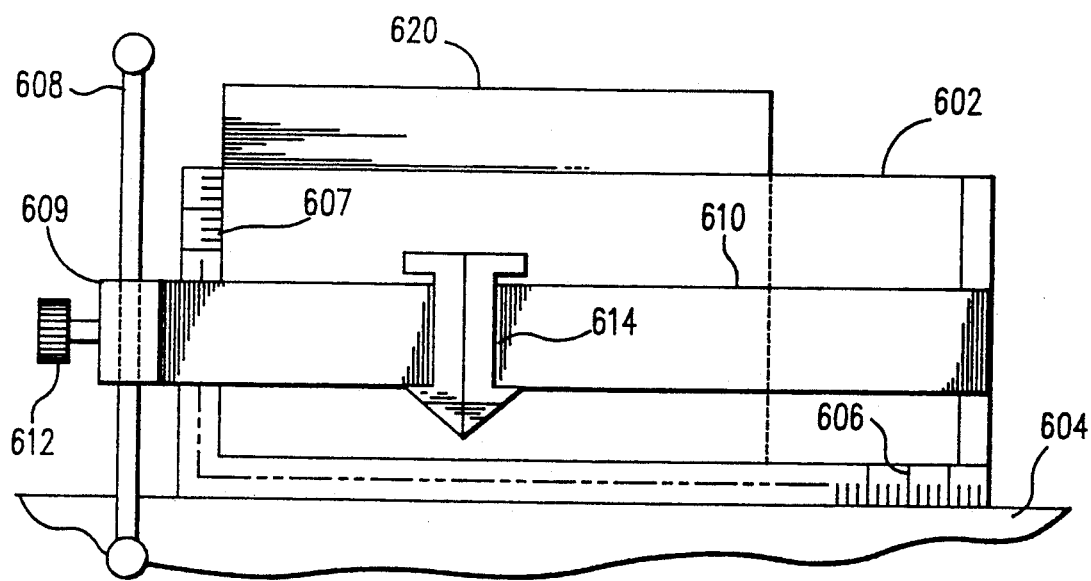
FIG. 14 is a front view of a read window set-up guide according to an embodiment of the invention.

The read window set-up guide 600 of the embodiment of FIG. 14 is advantageously provided to assist in the set-up of the read window assembly 570 of FIGS. 13A-13C. In this regard, the read window set-up guide 600 provides the operator with a simple and quick manner of determining where the top flange 585 of the slide 584 should be positioned relative to the indicia scale 586 for a certain address field on an envelope.

The read window set-up guide 600 is stored behind the keyboard 32, but for use is slidable from out behind the keyboard 32 to assume the appearance shown in FIG. 14. The read window set-up guide 600 comprises a transparent, essentially rectangular plastic member 602 mounted on a support shelf 604. The plastic member 602 has a horizontal scale 606 and a vertical scale 607 provided along bottom and left edges thereof, respectively.

The support shelf 604 also carries a stationary post 608. A sleeve 609 extends over the post 608 and has a horizontal, opaque plate 610 attached thereto, so that the plate 610 extends over the plastic member 602 and parallel to the horizontal scale 606 formed at the bottom edge of the plastic member 602 The width of the opaque plate 610, i.e. the extent of the plate along the vertical horizontal scale 607, corresponds to the extent of vertical scan of the particular reader employed in the system. The positioned of the opaque plate 610 relative to the post 608 is selectively lockable by virtue of thumb screw 612. The opaque plate 610 carries an arrow-shaped indicator 614 which slides along the plate 610 in the horizontal direction.

The read window set-up guide 600 is operated in conjunction with the read windown assembly 570 in the following manner. An envelope 620 having the address field positioning for a batch is position behind the transparent plastic member 602 of the read window set-up guide 600. The arrow-shaped indicator 614 is moved to the position of the zip code field in the envelope address The opaque plate 610 is slid along post 608 so that the plate 610 covers the address field. Numbers on the vertical scale 606 and the horizontal scale 607 can be used to move the top flange 585 of the sliding spring steel plate 584 of the read window assembly 570 into corresponding alignment with suitable indicia 586.

OPERATION: FEEDER SECTION

In operation, motors 142 and 156 are turned on ("energized") and envelopes 86 are placed on-edge on the transport belts 112. With motor 156 energized, rollers 75 and 157 continuously rotate in the clockwise direction. The size of the first stage singulation gap 142 is preset by manipulating the adjustment screw 155 of the biasing means 152 of the first stage singulator means 74. The compression plate 124 is translated along guide rod 108 to a point whereat the envelopes 86 are snuggly compressed in a stack between the compression plate 124 at the rear end of the stack and the feeder 72 and the feed assist device 80 at the front end of the stack. With feed assist carriage 200 in a normal operating position, the signal on line 246 from feeder switch 244 causes the signal controller 190 to send signals on line 192 to the clutch/brake mechanism 138 associated with the feeder 72. The signal prompts the clutch/brake mechanism 138 to allow the feeder belt 130 to revolve clockwise around rollers 132 and 134.

Revolution of feeder belt 130 directs the foremost envelope 86A in the input transport section 24 in the direction of arrow 88 by imparting momentum to the envelope 86A upon contact of the revolving belt 130 with the envelope sidewall. The envelope is thus directed to the singulation region 73.

In the singulation region 73, the envelopes first pass through the first stage singulation gap 142 defined by the first stage singulation means 74 and the feeder 72. As an envelope approaches the first stage singulation means 74, the envelope first contacts the roller 150. If the envelope is a thicker envelope than that contemplated upon presetting the first stage singulation gap 142, contact with the roller 150 causes the lever arm 146 to back away from the feeder 72. That is, the envelope drives lever arm 146 in the direction opposite the direction depicted by arrow 42, thereby widening the first stage singulation gap 142. Thus, contact of roller 150 by an envelope can serve to displace the stones 144A, 144B, and thus temporarily redefine the first stage singulation gap 142 for thick envelopes.

Upon leaving the first stage singulation gap 142, the leading edge of an envelope heads toward the second stage singulation gap 143 defined by the rotating pull-out roller 75 and roller 76 The rotating pull-out roller 75 imparts further momentum to the envelope 86, directing the envelope 86 further in the direction of arrow 88 and into the nip of continuously rotating roller 157 and roller 158.

When the leading edge of an envelope blocks beam 178 between transmitter 174 and receiver 176 just upstream from the roller pair 150, 152, receiver 176 sends a signal on line 186 to signal controller 190. Upon receipt of such signal on line 186, the signal controller 190 applies a signal on line 192 to the clutch/brake mechanism 138 for stopping the motion of feeder belt 130. This braking of feeder belt 130 precludes the immediate feeding of a further envelope, and thus facilitates a slight delay and spacing between envelopes.

Figure 10:
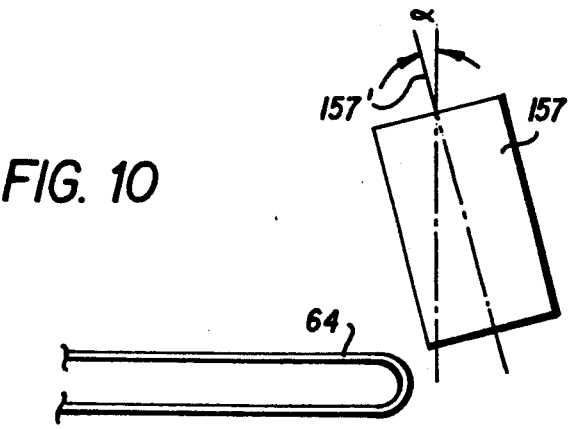
FIG. 10 is a schematic view showing the relationship of a roller and a horizontal belt of the embodiment of FIG. 1.

Continuously rotating roller 157 directs an envelope 86 further downstream toward transport system 62. As mentioned before, transport system 62 includes revolving horizontal belt 64 and vertical belts 66 and 68. Since the axes 157' and 158' of the rollers 157 and 158 are inclined at angle alpha with respect to the vertical (as shown in FIG. 10), the rollers 157 and 158 direct the envelope with a downward component so that the envelope 86 registers on the horizontal belt 64. The belts 64, 66, and 68 included in the transport system 62 carry the envelope 86 through the processing/transport section 24 in the direction of arrow 44.

The signal controller 190 turns the clutch/brake mechanism 138 back on at a predetermined time after beam 178 is interrupted. In the illustrated embodiment, the predetermined time is 1/5 second.

Upon emerging from the nip between rollers 157 and 158, the leading edge of envelope 86 blocks beam 184 between transmitter 180 and receiver 182. When beam 184 is thusly blocked, a signal on line 188 is applied to the signal controller 190. The signal controller 190 examines the frequency of the interruptions of beam 178 to determine whether the feeder 72 is having difficulty in feeding the next envelope. For example, at a given speed of the roller 75, the signal controller knows how many envelopes should interrupt beam 178 every second. If the controller 190 determines that difficulty is experienced by the feeder 72, the signal controller 190 applies a signal on line 278 to the feed assist means, and more particularly to the assist displacement control means 84.

Figure 11A:
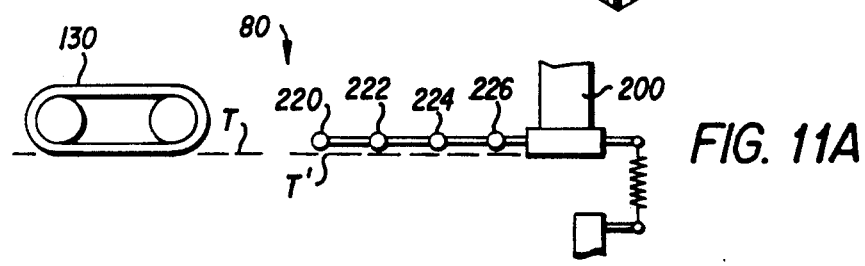
FIGS. 11A and 11B are schematic views showing a feeder assist device of the embodiment of FIG. 1 in a normally biased position and in a displaced position, respectively.
Figure 11B:
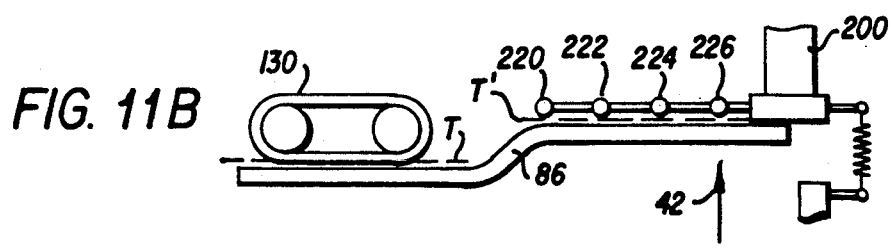

The signal on line 278 from the signal controller ultimately serves to retract the feed assist means 80 in the direction 42 so that, as shown in FIGS. 11A and 11B, the feeder belt 130 of feeder 72 can better contact the next envelope 86 for driving the next envelope in the direction of arrow 88 toward the singulation region 73. In particular, a signal on line 278 serves to displace the feed assist means 80 from its normally biased position as shown in FIG. 11A (wherein the tangent plane T to feeder belt 130 is essentially coplanar to a common tangent plane T' to each of the rollers 220, 222, 224, and 226) to a displaced position such as that shown in FIG. 11B (whereat the common tangent plane T' is displaced in the direction of arrow 42 from the tangent plane T).

The feed assit means 80 is displaced to a position such as that shown in FIG. 11B in the following manner: The signal applied on line 278 causes the output shaft 274 of stepper motor 276 to retract toward post 106B. The retraction of output shaft 274 causes rectangular block 252, and switch 254 carried thereon, to move further toward the left as shown in FIG. 4. The signal controller 190 continues to apply signals on line 278 until the leftward movement of switch 254 moves feeler arm 258 out of contact with the cam surface 208 of the feed assist carriage 200. The switch 254 then applies a signal on line 260 to activate the input transport motor 118. Activation of motor 118 drives pulleys 114A, 114B, and 114C, with the result that belts 112A, 112B, and 112C are incrementally advanced in the direction of arrow 42. As the belts 112 advance, so do the envelopes 86 and the compression plate 124 carried thereupon. Advancement of the envelopes 86 and compression plate 124 in the direction of arrow 42 causes the stack of envelopes 86 to bear with increasing pressure against the feeder belt 130 and feed assist means 80 (particularly against the rollers 220, 222, 224, and 226 which the lead envelope contacts) until the bias of spring 212 is overcome When the bias of spring 212 is overcome, the entire feed assist carriage 200 is displaced in the direction of arrow 42, with the result that tangent plane T' is no longer co-planar with tangent plane T (see FIG. 11A). When the feed assist carriage 200 is sufficiently retracted so that feeler arm 258 of switch 254 again contacts cam surface 208, the switch 254 applies a signal on line 260 to deactivate the input transport motor 118, and thereby temporarily stop advancement of the belts 112.

With belts 112 stopped and feeder 72 still feeding, pressure against the feed assist means 80 decreases, with the result that the feed assist carriage 200 is pulled by bias spring 212 toward its normal biased position. In moving toward its normally biased position, feed assist carriage 200 may again lose contact with the feeler arm 258 of switch 254, causing switch 254 to again activate advancement of the transport belts 112, and thus the envelope stack, toward the feeder 72 and the feed assist means 80. Pressure then again increases on the feed assist means 80, so that the feed assist means 80 is displaced sufficiently that the feeler arm 258 again rides on cam surface 206 of carriage 200. At that point, the input transport belts 112 again cease incrementation.

The feed assist means 80 including the feed assist carriage 200 thus can continuously linearly roam from and return to its normally biased position (which is the furthest extent of its permitted travel toward the input envelope stack), depending on the pressure bearing against the feed assist means 80. As disclosed above, when the signal controller 190 determines that the feeder 72 is having difficulty in feeding a next envelope, the assist displacement control means 84 facilitates the further displacement of the feed assist means 80 by increasing pressure in the envelope input section. Thus, acting through the assist displacement control means 84, the signal controller 190 attempts to overcome difficulties encountered in feeding an envelope, such as a thick envelope, by requiring an increase in pressure against the feed assist means 80, thereby necessitating greater displacement of the feed assist means 80 from its normally biased position, and thereby facilitating enhanced driving force on the difficult envelope. Accordingly, as shown with respect to FIGS. 11A and 11B, the greater the difficulty encountered in feeding an envelope, the greater the distance becomes between tangent planes T and T'.

If the feed assist means 80 is displaced so far from the tangent plane T such that the feeding of doubles occur, the signal controller 190 will detect the feeding of doubles and ultimately cause the feed assist means 80 to travel back toward the tangent plane T. In this regard, the feeding of doubles causes the detector beam 178 to be blocked for a time period longer than that permitted by the signal controller 190. The signal controller 190 detects the abnormally long blockage of beam 178, knowing the maximum length of an envelope and the peripheral speed of the pull-out roller 75. When an abnormally long blockage occurs, the signal controller 190 sends a signal on line 278 to extend the output shaft 274 of the stepper motor 276 away from post 106B. As understood with reference to the foregoing description of the retraction of output shaft 274, the extension of shaft 274 causes the feed assist device to travel in the direction opposite that depicted by arrow 42 (i.e., back towards the tangent plane T).

Figure 12:
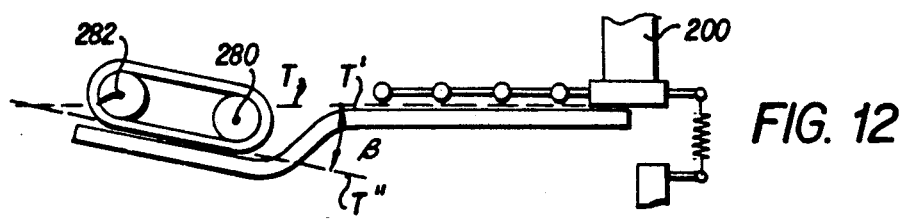
FIG. 12 is a schematic view showing the displacement of a feeder belt according to the embodiment of FIG. 9.

The operation of the embodiment of FIG. 9 resembles the operation described above, except that, upon revolution of belt 130', roller 134' essentially kicks belts 130' out of plane T, such that the tangent plane T' of belt 134' is displaced by angle beta as shown in FIGS. 9 and 12. Pivotal movement of the feeder belt 130' in this manner causes the application of greater force to the foremost envelope in the input stack. Upon braking of the feeder 72, the roller 134' resumes its normal positions, as shown by tangent plane T.

OPERATION: STACKER SECTION

After being processed along the processing path 26 of the processing/transport section 24, an envelope is directed on-edge by the horizontal belt 64 and vertical belts 66, 68 of section 24 toward the introductory conveying means 302. The path of travel of an envelope E thorough the stacker section 38 is represented by FIGS. 8A–8E, which are frames representing successive stages of the path of travel.

Figure 8A:
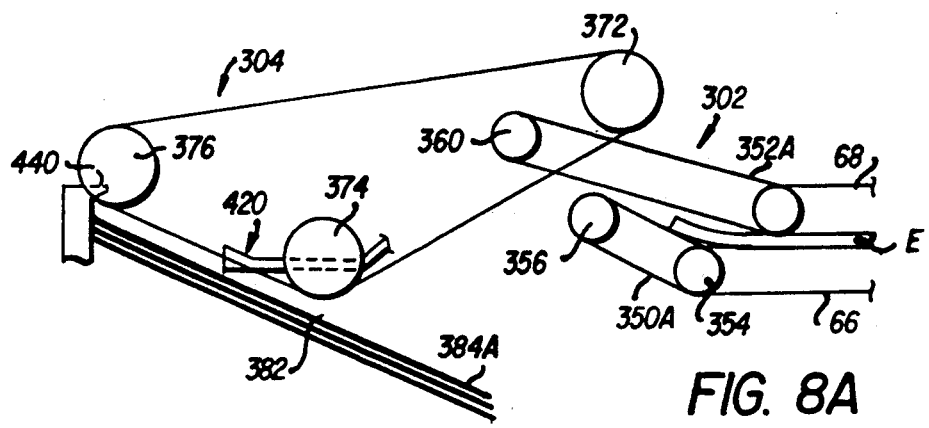
FIGS. 8A-8E are schematic top views showing successive stages of travel of a flat article through the stacker section of the embodiment of FIG. 5.

Upon leaving the processing/transport section 24, as shown in FIG. 8A the envelope E encounters the O-ring pairs 350, 352 which comprise the introductory conveying means 302. As the leading edge of the envelope E contacts the front O-rings 350A, 350B, and then the rear O-rings 352A and 352B, the leading edge of the envelope E is deflected from direction 44 about the acute angle 362, so that the envelope travels along the linear introductory path 360.

Figure 8B:
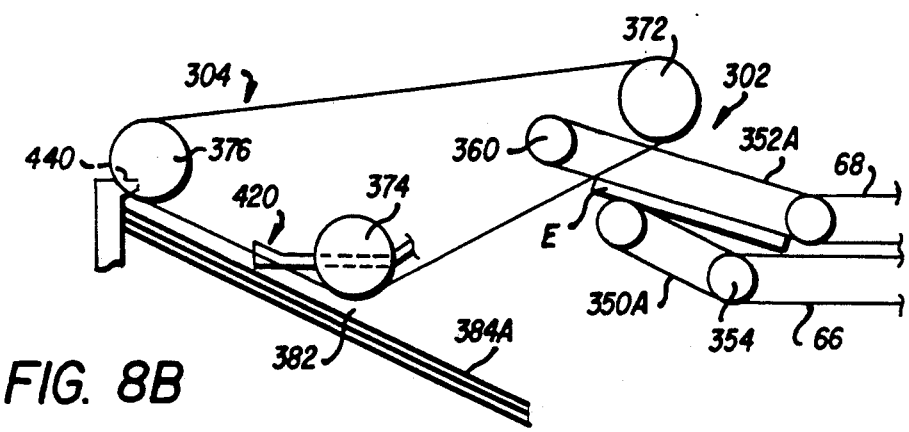

FIG. 8B shows how the introductory conveying means 302 directs the leading edge of the envelope E along the linear introductory path 360 and toward the stacker conveying means 304, and particularly to the stacker belts 370. FIG. 8B also shows that the leading edge of the envelope E contacts the stacker belts 370.

Figure 8C:
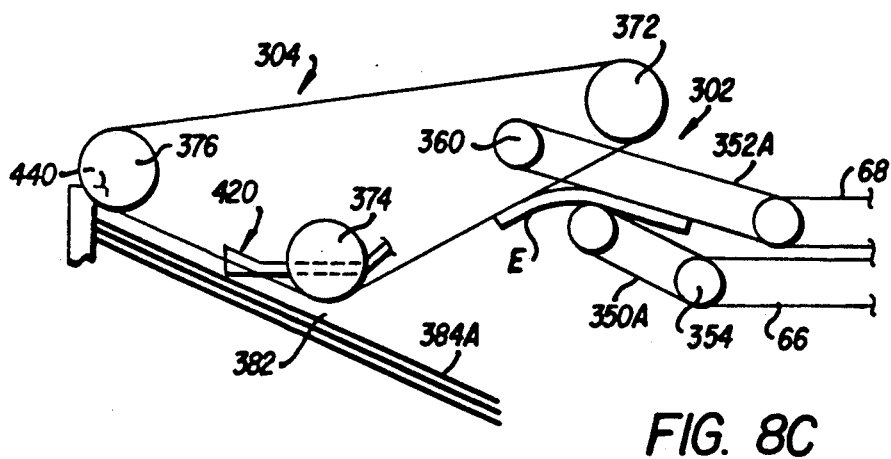

FIG. 8C shows how the stacker conveying means 304 directs the envelope E on its edge along the first linear path segment 380 toward the discharge magazine 300. The stacker belts 370 comprising the stacker conveying means 304 thus deflect the envelope E about the obtuse angle 386 between the linear introductory path 360 and the first linear path segment 380, so that the leading edge of the envelope E is now headed toward the discharge magazine 300. In particular, the envelope E is now headed toward the bend point 391 and thus toward the mid-section 382 of a previously-stacked envelope 384A.

Figure 8D:
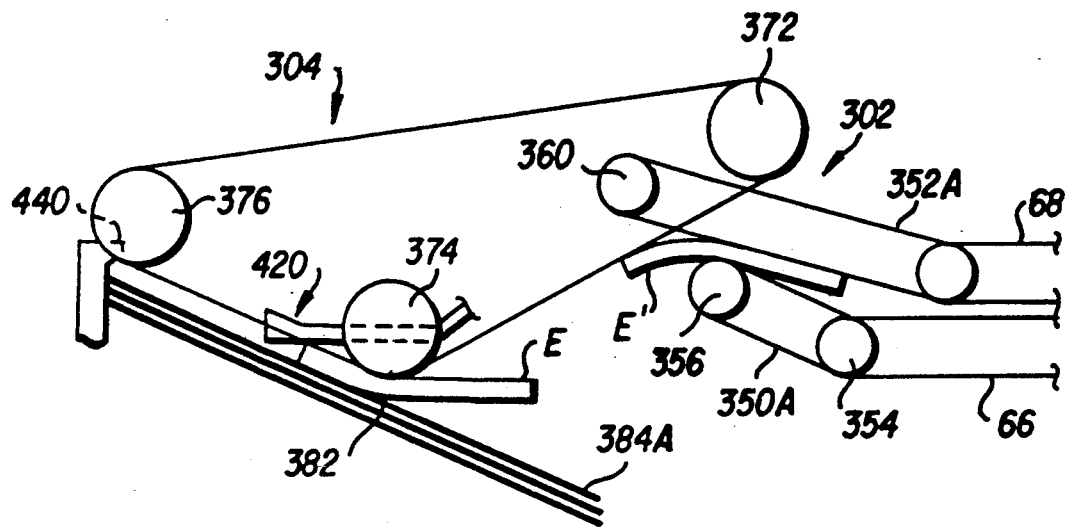

FIG. 8D shows how the stacker conveying means 302 interposes the envelope E between the previously stacked envelope 384A and the stacker belts 370. After the leading edge of the envelope E is deflected around the obtuse angle 390 at the bend point 391, the leading edge of envelope E commences its travel along the second linear path segment 388. The bending of the envelope E at the bend point 391, as the envelope E is interposed between the stacker belts 370 and the previously stacked envelope 384, causes the trailing edge of the envelope E to be displaced through the acute angle 392, so that the trailing edge essentially "fishtails" out of the path of the next envelope E'.

This displacement of the trailing edge of the envelope E is facilitated by the positioning element 394, and particularly the helically threaded first portion 394A thereof. In particular, the bottom of the trailing edge of the envelope E is engaged to ride in the helical threads 404 of the rapidly rotating positioning element 394, so that the element 394 serves to quickly propel the trailing edge of the envelope along the direction of arrow 45, even before the envelope E encounters the discharge belts 342 and while the leading edge of the envelope E is heading up the second linear path segment 388. Indeed, with the trailing edge of the envelope E experiencing a component of motion in the direction of arrow 45, and the leading edge having a component of motion in the opposite direction (i.e., back up to pulley 376), it is understood how the fishtailing is facilitated. After its trailing edge is displaced through the acute angle 392, the envelope E then regains its linear profile which, as illustrated in FIG. 8E, is colinear with the second linear path segment 388.

It should be noted that the length of the first linear path segment 380 is sufficiently long such that, when the trailing edge of an envelope E is displaced or fishtailed through the angle 392, the trailing edge of envelope E does not strike the pulley 356, i.e. does not cross the linear introductory path 360.

Figure 8E:
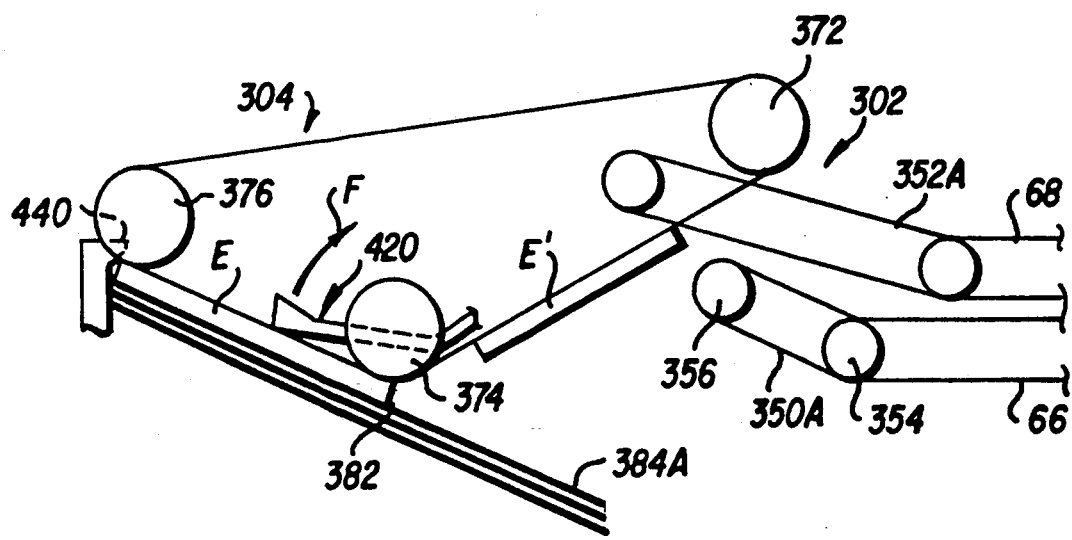

FIG. 8E further shows how the envelope E settles in the stack formed by the discharge magazine 300. In particular, envelope E is situated so that as its front sidewall contacts the previously stacked envelope 384A, its rear sidewall contacts the moving stacker belts 370. The leading edge of envelope E then abuts the magazine abutment means 322. Stripper member 440 formed on the abutment means 322 precludes the leading edge of envelope E from travelling further along with the stacker belts 370, so that the envelope E is retained in the discharge magazine.

As the envelope E strikes the abutment means 322, what would otherwise be an audibly noticeable popping sound is muffled by the acoustic insulation material 338 provided in the internal cavity 336 of the abutment wall 322.

FIG. 8E also shows what happens when the discharge magazine 300 becomes sufficiently loaded with envelopes, i.e., when enough envelopes become interposed between the stacker belts 370 and the compression plate 330 that the discharge transport belts 342 need to be activated to carry the envelopes and compression plate 330 further away from the stacker section 38 in the direction of arrow 45. The stack of envelopes in the magazine 300, acting through the rear sidewall of envelope E, exerts sufficient force F on the second end 422B of the sensor lever arm to cause the sensor lever arm to pivot in the clockwise sense about the pivot post 428. If the force F is sufficiently great to overcome the bias on the first end 422A of the sensor lever arm provided by the spring 426, the first end 422A of the sensor lever arm will trip the microswitch 430. When the microswitch 430 is so tripped, the microswitch 430 sends an electrical signal to activate the discharge transport drive motor 433 When activated, the discharge transport drive motor 433 drives pulleys and the discharge transport belts 342 entrained thereabout, so that the belts 342 and the envelopes and compression plate 330 riding thereon are transported further away from the stacker section 38 in the direction depicted by arrow 45, with the result that the stack becomes less tight for accommodating further envelopes.

As the envelopes stacked in the discharge magazine 300 are transported away from the stacker section 38 in the direction of arrow 45, the leading edges thereof contact the ridges 340 provided on the magazine abutment wall 322. The ridges 340 essentially serve as bearing points to reduce the frictional drag between the envelopes and the abutment wall 322, with the result that envelopes are less susceptible to snagging or jamming in the magazine 300.

The positioning element 394 also continues to optimally position the envelopes in the discharge magazine 300. The second portion 394B of the element, also being rotatably driven, periodically elevates the bottom edges of envelopes riding thereon so that the envelopes become properly registered against the abutment wall 322. In this regard, and as shown in FIG. 6, when the chordlike surfaces 406 of the element 394 are parallel with the horizontal, the element 394 is substantially planar with the magazine floor 320. However, when the arcuate surfaces 408 of the member 394 are positioned to protrude through the slot 398 formed in the magazine floor 320, the bottom edges of the envelopes are elevated, with the result that the bottom edges of the envelopes become inclined at the angle 410 with respect to the magazine floor 320.

While the invention has been particularly shown and described with reference to the preferred embodiments thereof, it will be understood by those skilled in the art that various alterations in form and detail may be made therein without departing from the spirit and scope of the invention.

The embodiments of the invention in which an exclusive property or privilege is claimed are defined as follows:

1. An apparatus for forming a window in which printed characters on an item such as an envelope is readable, said apparatus comprising:
   a substantially vertical base member fastened to a planar horizontal surface and positionable between a reader device and an on-edge envelope, said vertical base member having an elongated vertical slot provided therein;
   a slide member having a bottom edge which includes a dimpled portion which fits into said elongated vertical slot of said vertical base member;
   means for selectively adjusting a position of the bottom edge of said slide member relative to said vertical base member with said dimpled portion of said slide member fitting into said elongated vertical slot of said vertical base member, whereby said bottom edge of said slide member and a portion of said elongated vertical slot below said bottom edge of said slide member form a read window through which characters are readable.

2. The apparatus of claim 1, wherein said slide member is resilient.

3. The apparatus of claim 2, wherein said slide member is a narrow spring steel plate.

4. The apparatus of claim 1, wherein said slide member has indicia provided thereon.

5. The apparatus of claim 1, wherein said means for selectively adjusting the position of the bottom edge of said slide member relative to said vertical base member comprises fastening means which bears against said slide member.

6. The apparatus of claim 1, wherein said substantially vertical base member has a top portion which has an angular orientation with respect to the vertical.

7. An apparatus for forming a window in which printed characters on an item such as an envelope is readable, said apparatus comprising:
   a base member fastened to a planar horizontal surface and positionable between a reader device and an on-edge envelope, said base member having a substantially vertical lower portion thereof in which an elongated vertical slot is provided and an upper portion inclined at an angle with respect to the vertical;
   a resilient slide member having a bottom edge;

means for selectively adjusting a position of the bottom edge of said slide member relative to said vertical base member whereby said bottom edge of said slide member and a portion of said elongated vertical slot below said bottom edge of said slide member form a read window through which characters are readable, and whereby a lower portion of said resilient slide member assumes the substantially vertical orientation of said lower portion of said base member and an upper portion of said resilient slide member assumes the angularly inclined orientation of said upper portion of said base member.

8. The apparatus of claim 7, wherein said slide member is a narrow spring steel plate.

9. The apparatus of claim 7, wherein said slide member has indicia provided thereon.

10. The apparatus of claim 7, wherein said means for selectively adjusting the position of the bottom edge of said slide member relative to said vertical base member comprises fastening means which bears against said slide member.

11. An apparatus for forming a window in which printed characters on an item such as an envelope is readable, said apparatus comprising:

a base member fastened to a planar horizontal surface and positionable between a reader device and an on-edge envelope, said base member having a substantially vertical lower portion thereof in which an elongated vertical slot is provided and an upper portion inclined at an angle with respect to the vertical;

a resilient slide member having a bottom edge which includes a dimpled portion which fits into said elongated vertical slot of said base member;

means for selectively adjusting a position of the bottom edge of said slide member relative to said vertical base member whereby said bottom edge of said slide member fitting into said elongated vertical slot of said vertical base member, whereby said bottom edge of said slide member and a portion of said elongated vertical slot below said bottom edge of said slide member form a read window through which characters are readable, and whereby a lower portion of said resilient slide member assumes the substantially vertical orientation of said lower portion of said base member and an upper portion of said resilient slide member assumes the angularly inclined orientation of said upper portion of said base member.

12. The apparatus of claim 11, wherein said slide member is a narrow spring steel plate.

13. The apparatus of claim 11, wherein said slide member has indicia provided thereon.

14. The apparatus of claim 11, wherein said means for selectively adjusting the position of the bottom edge of said slide member relative to said vertical base member comprises fastening means which bears against said slide member.

15. An apparatus for forming a window in which printed characters on an item such as an envelope is readable, said apparatus comprising:

a substantially vertical base member fastened to a planar horizontal surface and positionable between a reader device and an on-edge envelope, said vertical base member having an elongated vertical slot provided therein;

a slide member having a bottom edge, the slide member fitting into said elongated vertical slot of said vertical base member;

means for selectively adjusting a position of the bottom edge of said slide member relative to said vertical base member, whereby said bottom edge of said slide member and a portion of said elongated vertical slot below said bottom edge of said slide member form a size adjustable read window through which characters are readable.

16. The apparatus of claim 15, wherein said slide member is resilient.

17. The apparatus of claim 16, wherein said slide member is a narrow spring steel plate.

18. The apparatus of claim 15, wherein said slide member has indicia provided thereon.

19. The apparatus of claim 15, wherein said means for selectively adjusting the position of the bottom edge of said slide member relative to said vertical base member comprises fastening means which bears against said slide member.

20. The apparatus of claim 15, wherein said substantially vertical base member has a top portion which assumes an angular orientation with respect to the vertical.

* * * * *